(12) United States Patent
Menon et al.

(10) Patent No.: US 11,731,792 B2
(45) Date of Patent: Aug. 22, 2023

(54) KITTING MACHINE

(71) Applicant: Dexterity, Inc., Palo Alto, CA (US)

(72) Inventors: Samir Menon, Palo Alto, CA (US); Gerald Brantner, Los Altos, CA (US); Zhouwen Sun, Redwood City, CA (US); Robert Hegdahl, Hayward, CA (US); Kevin Jose Chavez, Palo Alto, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 16/143,278

(22) Filed: Sep. 26, 2018

(65) Prior Publication Data
US 2020/0094997 A1     Mar. 26, 2020

(51) Int. Cl.
| | | |
|---|---|---|
| *B25J 9/16* | (2006.01) | |
| *B65B 5/08* | (2006.01) | |
| *B65B 5/12* | (2006.01) | |
| *B65B 35/54* | (2006.01) | |
| *B65B 43/52* | (2006.01) | |
| *B65B 43/54* | (2006.01) | |
| *B65G 1/137* | (2006.01) | |
| *G05D 1/00* | (2006.01) | |

(Continued)

(52) U.S. Cl.
CPC ............. *B65B 5/08* (2013.01); *B25J 9/1679* (2013.01); *B25J 9/1697* (2013.01); *B65B 5/12* (2013.01); *B65B 35/54* (2013.01); *B65B 43/52* (2013.01); *B65B 43/54* (2013.01); *B65B 57/14* (2013.01); *B25J 9/1689* (2013.01)

(58) Field of Classification Search
CPC .... B65G 1/1376; B65G 1/1378; G06N 20/00; B25J 9/1689; B25J 9/1661; B25J 9/1687; G05D 1/0061; G05D 1/0088; G06Q 10/087

USPC .............................................. 53/493; 706/12
See application file for complete search history.

(56) References Cited

U.S. PATENT DOCUMENTS

| | | | |
|---|---|---|---|
| 4,142,636 A | | 3/1979 | Planke |
| 4,189,273 A | * | 2/1980 | Soderstrom .......... B65G 1/1378 |
| | | | 198/367 |

(Continued)

FOREIGN PATENT DOCUMENTS

| | | |
|---|---|---|
| CN | 101039854 | 9/2007 |
| CN | 103008258 | 4/2013 |

(Continued)

OTHER PUBLICATIONS

Bozer et al. Kitting versus line stocking: A conceptual framework and a descriptive model. International Journal of Production Economics, 28 28 (1992). pp. 1-19. (Received Mar. 3, 1991; accepted in revised form Mar. 15, 1992).

*Primary Examiner* — Thanh K Truong
*Assistant Examiner* — Patrick B Fry
(74) *Attorney, Agent, or Firm* — Van Pelt, Yi & James LLP

(57) ABSTRACT

A kitting machine is disclosed. In various embodiments, the machine includes an actuator configured to move a surface or receptacle to a position associated with item retrieval; and a controller configured to control operation of the actuator to position an item in the position associated with item retrieval, in a manner that is synchronized at least in part with operation of a robotic retrieval device configured to retrieve the item from the position associated with item retrieval.

33 Claims, 14 Drawing Sheets

(51) Int. Cl.
*G06Q 10/08* (2023.01)
*B65B 57/14* (2006.01)

(56) References Cited

U.S. PATENT DOCUMENTS

| | | | |
|---|---|---|---|
| 4,284,187 A | 8/1981 | Kramer | |
| 4,669,390 A | 6/1987 | Bisiach | |
| 4,736,831 A | 4/1988 | Fields | |
| 4,819,784 A | 4/1989 | Sticht | |
| 4,894,908 A * | 1/1990 | Haba, Jr. | B23P 21/004 29/711 |
| 5,150,781 A * | 9/1992 | Deisenroth | B65G 1/0478 198/349.8 |
| 5,768,856 A | 6/1998 | Odenthal | |
| 6,210,079 B1 | 4/2001 | Teoh | |
| 6,275,743 B1 | 8/2001 | Kondo | |
| 6,711,798 B2 * | 3/2004 | Sanders | G05B 19/00 198/346.2 |
| 6,804,880 B2 * | 10/2004 | Yamamoto | B23P 21/004 198/395 |
| 6,883,297 B2 | 4/2005 | Kirk | |
| 8,276,739 B2 * | 10/2012 | Bastian, II | B65G 1/026 198/347.1 |
| 8,660,688 B2 * | 2/2014 | Urabe | B25J 9/0087 700/213 |
| 8,755,931 B2 | 6/2014 | Issing | |
| 9,346,630 B2 | 5/2016 | Nishizaka | |
| 9,481,518 B2 * | 11/2016 | Neiser | B65G 1/1378 |
| 9,492,923 B2 * | 11/2016 | Wellman | G06Q 10/087 |
| 9,669,543 B1 * | 6/2017 | Stubbs | H05K 999/99 |
| 9,676,507 B2 * | 6/2017 | Kudia | B65B 11/025 |
| 9,688,472 B1 * | 6/2017 | Stubbs | B25J 9/0096 |
| 9,738,455 B2 | 8/2017 | Neiser | |
| 9,926,138 B1 * | 3/2018 | Brazeau | B65G 1/1376 |
| 9,969,082 B1 * | 5/2018 | Berard | B25J 9/1661 |
| 9,996,805 B1 * | 6/2018 | Lisso | B65B 59/001 |
| 10,124,489 B2 | 11/2018 | Chitta | |
| 10,360,531 B1 * | 7/2019 | Stallman | G06K 19/07758 |
| 11,325,782 B2 * | 5/2022 | Avraham | B25J 13/02 |
| 2002/0063037 A1 | 5/2002 | Bruun | |
| 2004/0086364 A1 * | 5/2004 | Watanabe | B25J 19/021 414/416.01 |
| 2004/0093120 A1 | 5/2004 | Ebisawa | |
| 2004/0129150 A1 | 7/2004 | Lancaster, III | |
| 2007/0212174 A1 | 9/2007 | Hayashi | |
| 2011/0125307 A1 * | 5/2011 | Dickson | B23P 21/004 700/112 |
| 2012/0209796 A1 * | 8/2012 | Vashist | G06N 20/00 706/12 |
| 2012/0297733 A1 | 11/2012 | Pierson | |
| 2013/0110280 A1 | 5/2013 | Folk | |
| 2014/0207276 A1 | 7/2014 | Roush | |
| 2014/0244026 A1 | 8/2014 | Neiser | |
| 2015/0134110 A1 | 5/2015 | Koyanagi | |
| 2015/0371023 A1 * | 12/2015 | Chen | G06N 20/00 706/12 |
| 2016/0089791 A1 | 3/2016 | Bradski et al. | |
| 2016/0221766 A1 | 8/2016 | Schroader | |
| 2017/0225330 A1 | 8/2017 | Wagner et al. | |
| 2018/0005148 A1 * | 1/2018 | Yu | G06Q 10/0631 |
| 2018/0032949 A1 | 2/2018 | Galluzzo | |
| 2018/0164773 A1 * | 6/2018 | Wang | B25J 9/16 |
| 2018/0194573 A1 | 7/2018 | Iwai | |
| 2019/0061151 A1 | 2/2019 | Namiki | |
| 2019/0359424 A1 * | 11/2019 | Avraham | G06Q 50/28 |

FOREIGN PATENT DOCUMENTS

| | | |
|---|---|---|
| CN | 203170601 | 9/2013 |
| CN | 103596862 | 2/2014 |
| CN | 203528867 | 4/2014 |
| CN | 105129124 | 12/2015 |
| CN | 206050194 | 3/2017 |
| CN | 107000208 | 8/2017 |
| CN | 107108126 | 8/2017 |
| CN | 107697359 | 2/2018 |
| CN | 207001629 | 2/2018 |
| CN | 107876429 | 4/2018 |
| CN | 108349083 | 7/2018 |
| EP | 2233400 | 5/2013 |
| JP | S5374992 | 7/1978 |
| JP | S59190704 | 12/1984 |
| JP | H0540907 | 2/1993 |
| JP | H05112322 | 5/1993 |
| JP | H06239424 | 8/1994 |
| JP | H06312834 | 11/1994 |
| JP | H06329211 | 11/1994 |
| JP | H08197343 | 8/1996 |
| JP | 2006008279 | 1/2006 |
| JP | 2007238287 | 9/2007 |
| JP | 2011131901 | 7/2011 |
| JP | 2016068161 | 5/2016 |
| JP | 2017537040 | 12/2017 |
| JP | 2018504333 | 2/2018 |
| KR | 20180100382 | 9/2018 |
| WO | 2010034044 | 4/2010 |
| WO | 2014013608 | 1/2014 |
| WO | 2018024311 | 2/2018 |
| WO | 2018089486 | 5/2018 |

* cited by examiner

KITTING MACHINE

BACKGROUND OF THE INVENTION

Kitting and related processes typically involve gathering and packaging individual items together in a single kit or package. For example, an online or mail order retailer may collect individual items included in an order and package them together in a box or other packaging, which is then addressed and shipped to a destination address associated with the order.

Retailers and other vendors typically stock individual items they offer for sale. Such stock may be maintained in a warehouse or other storage facility. A process to fulfill an order may involve locating and selecting the ordered quantity of each individual item; selecting packaging, such as a box of a size and dimensions to accommodate the collection of items in the order; arranging items in the box or other packaging; addressing and shipping the package; processing a sale transaction; etc.

Kitting may be performed manually. For example, employees may collect items from shelves, bins, or other storage locations, each in a corresponding location within a warehouse or other facility. Aspects of kitting operations have been automated in part, such as box assembly. Use of robots or other machines to perform kitting operations has been proposed and explored, but challenges have been encountered, such as the relative complexity associated with using a robotic arm to find arbitrary quantities of an arbitrary set of items, and providing and programming a robot to perform tasks such as reaching into a bin or shelf, picking up items of arbitrary size, fragility, consistency, etc. As a result, large scale kitting operations have continued to be human labor intensive.

BRIEF DESCRIPTION OF THE DRAWINGS

Various embodiments of the invention are disclosed in the following detailed description and the accompanying drawings.

DETAILED DESCRIPTION

Figure 1:
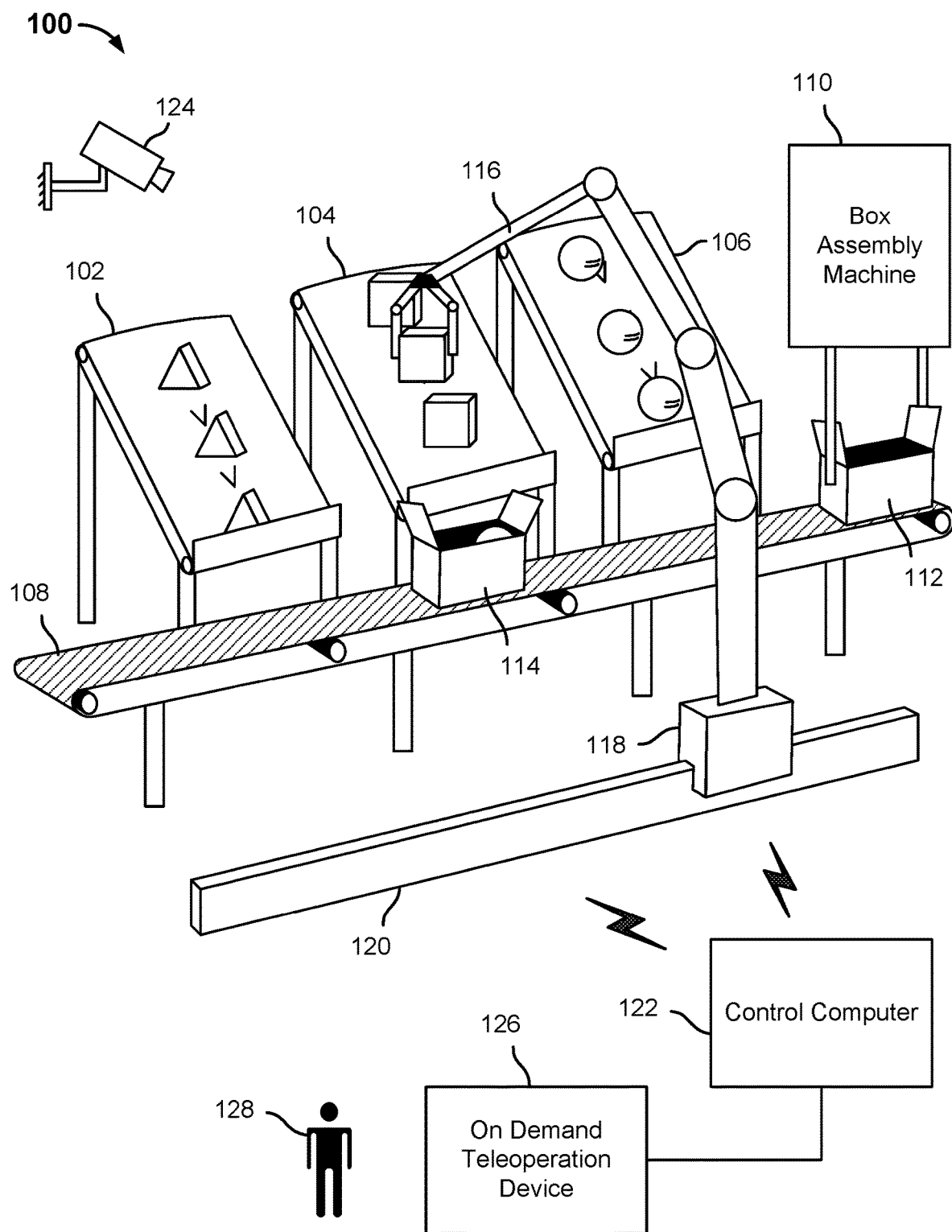
FIG. 1 is a diagram illustrating an embodiment of a kitting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

"Kitting machines" and their integration into highly automated kitting operations are disclosed. In various embodiments, a kitting machine as disclosed herein comprises an at least partly robotically controlled unit that supplies and positions an item to facilitate the item being located, picked up, and/or positioned in and/or for packaging and/or shipment as part of a kitting operation. In various embodiments, a kitting machine as disclosed herein may comprise one or more kitting system modules (KSM), each comprising a modular component. A KSM as disclosed herein may comprise one or more shelves, bins, or other receptacles. In some embodiments, the shelves, bins, or other receptacles may be positioned via robotic control to position an item of pick up. A KSM as disclosed herein may be integrated with one or more other KSM's, one or more robotic arms, and/or other components to comprise an at least partly automated kitting system, capable of locating, selecting, and packing prescribed quantities of each of one or more arbitrary individual items, such as items included in an order, invoice, or similar data.

In various embodiments, a robotic arm and/or a static, rail- or track-mounted, or mobile robot comprising a robotic arm or other appendage capable of retrieving items and placing them in a destination, such as a box or other packaging, is integrated with one or more KSMs as disclosed herein. The robotic arm retrieves items, as applicable, from the associated KSM(s) and places them in a box or other packaging for shipment.

In various embodiments, an integrated kitting system as disclosed herein operates in an automated manner unless/until the system gets stuck and has no strategy available to continue automated operation. In some embodiments, in response to entering such a state the system requests human intervention, e.g., by manual assistance, teleoperation, etc.

FIG. 1 is a diagram illustrating an embodiment of a kitting system. In the example shown, kitting system 100 includes a set of kitting machines 102, 104, and 106 arranged in a line alongside a box conveyor 108. A box assembly machine 110 assembles boxes 112, 114 and places them on conveyor 108. In various embodiments, box assembly machine 110 may be controlled by and/or in communication with other elements of the kitting system 100, e.g., to coordinate/synchronize box size selection and the timing of the assembly and placement of boxes, e.g., boxes 112, 114, on conveyor 108.

In the example shown in FIG. 1, robotic arm 116 is mounted on carriage 118, which is configured to ride along a rail or other linear guide 120 disposed alongside and substantially parallel to the conveyor 108, on a side opposite the kitting machines 102, 104, and 106. In various embodiments, a motor, belt, chain, or other source of motive force is applied via a controller (not shown in FIG. 1) to move the carriage 118 and attached robotic arm 116 along the rail or guide 120 to facilitate the automated retrieval of items from the kitting machines 102, 104, and 106 and the placement of items in boxes 112, 114 as they are moved along conveyor 108.

In the example shown, operation of one or more of the kitting machines 102, 104, and 106; conveyor 108; box assembly machine 110; and robotic arm 116 and/or carriage 118 are operated in a coordinated manner under the control of control computer 122. In the example shown, control computer 122 is in wireless communication with controllers, not shown in FIG. 1, each configured to control operation of a corresponding element comprising system 100, e.g., kitting machines 102, 104, and 106; conveyor 108; box assembly machine 110; and robotic arm 116 and/or carriage 118. While wireless connections are shown in FIG. 1, in various embodiments wired connections or a combination of wired and wireless connections may be used.

In the example shown in FIG. 1, robotic arm 116 terminates in a two-digit gripper. In various embodiments, robotic arm 116 may terminate in one or more other and/or different types of retrieval tool, including without limitation a gripper having three or more digits; a gripper having digits with different attributes than as shown, e.g., cushioned digits, smaller digits, larger digits, etc.; and/or a retrieval tool that is not a gripper, such as one configured to pick up items using suction, friction, electrostatic force, magnetic force, etc. In some embodiments, the gripper of robotic arm 116 may be interchanged with one or more different terminal devices, depending on one or more attributes of an item to be retrieved, e.g., weight, fragility, compressibility, rigidity, size, shape, etc. In some embodiments, the gripper of robotic arm 116 may be used to retrieve and use different gripper-held tools to items, depending on one or more attributes of the item to be retrieved, for example.

In various embodiments, control computer 122 is configured, e.g., by software running on control computer 122, to receive data associated with an invoice, order, part list, pick list, or other list of items to be retrieved and packed together; determine a strategy/plan to fulfill the retrieve and pack the required items; and operate elements of system 100, e.g., kitting machines 102, 104, and 106; conveyor 108; box assembly machine 110; and robotic arm 116 and/or carriage 118, in coordination to fulfill the requirement(s).

For example, in some embodiments, control computer 122 is configured to receive a list of items to be packed. Control computer 122 determines which items are associated with which of the kitting machines 102, 104, and 106 and makes a plan to retrieve and pack the items. Control computer 122 controls box assembly machine 110 to assembly a box (e.g., 112, 114) and deposit it on conveyor 108 and controls the conveyor 108 to advance the box to a position to be loaded with a first one or more items. The control computer 122 controls the carriage 118 and/or robotic arm 116 as needed to position the robotic arm 116 to retrieve the first one or more items from the associated one(s) of the kitting machines 102, 104, and 106. Control computer 122 may control the kitting machines 102, 104, and 106, e.g., to ensure the require item(s) in the required quantities are present in the pickup zone at the end of kitting machines 102, 104, and 106 nearest to the conveyor 108 and robotic arm 116. Control computer 122 controls robotic arm 116 to retrieve the item(s) from the corresponding pickup zone(s) and places them in the box (e.g., 112, 114) before moving on to perform coordinated retrieval and packing of any further items required to be included in that particular kit. Once all items have been retrieved and packed, control computer 122 controls conveyor 108 to advance the box (e.g., 112, 114) to a next stage of fulfillment, not shown in FIG. 1, e.g., a station at which the box is sealed, labeled, and sent to be shipped.

In the example shown in FIG. 1, kitting machines 102, 104, and 106 comprise angled conveyors configured to be loaded, e.g., by human workers, robots, and/or other machines, or some combination thereof, from a back end (upper/left as shown in FIG. 1). Items may be scanned, recognized by computer vision, etc. to determine and store on control computer 122 data associating the item and/or item type or other items attributes associated with each kitting machine. While in the example shown all three of the kitting machines 102, 104, and 106 are conveyors, in various embodiments a mix of different types of kitting machine may be included in a kitting system such as system 100. For example, the items shown in FIG. 1 as being supplied via kitting machine 106 may be supplied in some embodiments via a stationary ramp down which the items are rolled. In some embodiments, a kitting machine may comprise any one of a plurality of structures and mechanisms to supply items to an associated pick zone, including without limitation a gravity type conveyor having a plurality of adjacent rollers, a ramp, a conveyor belt, a set of revolving bins, etc.

In various embodiments, system 100 is initialized by having control computer 122 determine through automated processing, manual configuration, and/or a combination thereof the placement, type, capabilities, etc. of each kitting machine (e.g., 102, 104, and 106) and the item(s) associated with each kitting machine. In addition, elements of system 100 may register with the control computer 122. Registration may include admitting an element, such as each of the kitting machines 102, 104, and 106, to a control network. In some embodiments, operational tests may be performed. For example, control computer 122 may test its ability to control a newly-registered element, such as by operating the conveyor belt of a kitting machine, such as kitting machines 102, 104, and 106, in the forward and back directions, at various speeds, etc.

In various embodiments, elements of system 100 may be added, removed, swapped out, etc. In such an instance, control computer 122 initializes and registers the new element, performs operational tests, and begins/resumes kitting operations, incorporating the newly added element, for example.

Referring further to FIG. 1, in the example shown system 100 includes a video camera 124 configured to capture video images of the elements comprising system 100. Camera 124 may be one of a plurality of sensors used by control computer 122 to control the elements comprising system 100. For example, in the example shown, video generated by camera 124 and sent to control computer 122 may be used by control computer 122 to control the speed and/or direction of the conveyor belts comprising the kitting machines 102, 104, and 106 to ensure a sufficient and not excessive number of items are available in the pickup zone and/or to position or reposition the items for retrieval by robotic arm 116. In addition, camera 124 and/or other cameras may be used to facilitate robotic arm 116 picking up an item and/or placing the item in its box (e.g., 112, 114). In various embodiments, a plurality of cameras may be deployed in a number of locations, including in the environment and on the respective elements comprising system 100, to facilitate automated (and, if needed, human assisted) kitting operations. In various embodiments, sensors other than cameras may be deployed, including without limitation contact or limit switches, pressure sensors, weight sensors, and the like.

In various embodiments, control computer 122 is programmed to determine a plan to fulfill a kitting requirement based at least in part on a model of the robotic arm 116 and other elements comprising the system 100, e.g., kitting machines 102, 104, and 106; conveyor 108; box assembly machine 110; and robotic arm 116 and/or carriage 118. The respective models in various embodiments reflect capabilities and limitations of each respective element. For example, the kitting machines 102, 104, and 106 are in fixed positions in this example, but each has a conveyor belt which may be capable of being moved in forward and back directions and/or at different speeds. In addition, the control computer 122 may use information stored in connection with initialization and/or configuration, e.g., which items are on which location(s) on which kitting machine(s), where each kitting machine and/or its associated pick up zone is located, etc., to determine a plan to fulfill a requirement. In addition, control computer 122 may use data determine based at least in part on sensor data, such as video captured by camera 124, to make a plan to fulfill a requirement.

In various embodiments, control computer 122 is configured to formulate and/or update or reformulate a plan to fulfill a requirement, and to implement or attempt to implement the plan, by employing strategies to do a (next) task or subtask that have been programmed into and/or learned by control computer 122. Examples include, without limitation, strategies to use robotic arm 116 to pick up a given item based on attributes of the item (rigidity, fragility, shape, orientation, etc.). In some embodiments, control computer 122 is programmed to use a first (e.g., preferred or best) strategy to attempt to perform a task (e.g., pick up an item with robotic arm 116), and if that fails then to determine and use an alternate strategy, if one is available (e.g., use the robotic arm 116 to nudge the item then try again, operate the conveyor or other instrumentality of the kitting machine, e.g., 102, 104, and 106, forward and/or backward a bit and try again, etc.).

In the example shown in FIG. 1, control computer 122 is connected to an on demand teleoperation device 126 operated by a human operator 128. While in FIG. 1 teleoperation device 126 is operated by a human operator 128, in some embodiments teleoperation device 126 may be operated by a non-human operator, such as a highly skilled robot. In various embodiments, control computer 122 is configured to invoke on demand teleoperation based at least in part on a determination by control computer 122 that it does not have an available strategy to continue/complete a kitting operation and/or a component task thereof through fully automated operation. For example, an item is dropped in a location from which the robotic arm 116 cannot retrieve it; or, an item has been attempted to be picked up a prescribed maximum number of attempts and has not successfully been retrieved; etc. Based on such a determination, control computer 122 sends an alert or other communication to on demand teleoperation device 126, prompting human operator 128 to use teleoperation device 126 to operate one or more elements of system 100—e.g., one or more of kitting machines 102, 104, and 106; conveyor 108; box assembly machine 110; and robotic arm 116 and/or carriage 118—to perform at least the task or subtask the system 100 was not able to complete under fully automated control by control computer 122.

Examples of teleoperation device 126 include without limitation a tablet or other mobile device having a graphical user interface to control elements of system 100, a desktop or other computer having one or more input devices connected thereto to operate elements of system 100 remotely etc.

While in some embodiments control computer 122 invokes on demand teleoperation, in some embodiments a human operator such as operator 128 may monitor automated operation of system 100, e.g. via a video feed generated by camera 124, and may intervene to operate elements of system 100 by teleoperation if the human operator determines there is a need to intervene or assist.

In various embodiments, teleoperation device 126 and/or human operator 128 may be located remotely from a physical site at which system 100 is located and operates (mostly) in a fully automated mode. Similarly, control computer 122 may be located remotely from the site at which other elements of system 100 are located and/or a portion of the work described herein as being performed by control computer 122 may be performed by a computer located remotely from that site.

In various embodiments, control computer 122 is configured to learn new or improved strategies to employ elements of system 100 to perform kitting operations. For example, control computer 122 in some embodiments is programmed to record actions by a human operator (128) via teleoperation (126) and to update its model(s), strategies, etc., as appropriate to be able to repeat and/or emulate the actions of the human operator to perform the task or subtask for which teleoperation was required.

In various embodiments, control computer 122 is configured to continue to evaluate, during teleoperation, whether it has a viable plan and/or strategy to resume automated fulfillment of the current requirement. If so, control computer may be configured to resume automated operation, either proactively or by advising the human operator that control can be returned to control computer 122.

While in the example shown in FIG. 1 the boxes 112, 114 are moved by conveyor 108 into successive positions opposite the kitting machines 102, 104, and 106, in other embodiments the boxes 112, 114 may be place in a single, central position, by conveyor 108 or in some embodiments manually or by a machine other than conveyor 108, and may be filled by moving the robotic arm 116 into one or more positions to access and pick up items from the kitting machines 102, 104, and 106 and place them in the box 112, 114.

While a "kitting" operation is shown in FIG. 1 and described herein with reference to FIG. 1 and other Figures, in various embodiments kitting machines and integrated systems as disclosed herein may be used to perform the reverse operation, e.g., by stocking shelves, bins, and/or kitting machines with items removed from an initially full or partly full box of items. For example, in the example shown in FIG. 1, the box 114 may include a plurality of items associated with kitting machine 104, and robotic arm 116 may be used to remove items from the box 114 and place them on the kitting machine 104, e.g., from the back or supply end as shown.

In some embodiments, items on a kitting machine, such as machines 102, 104, and 106, or on a static shelf accessed by a kitting system as disclosed herein, may be supplied in bins. In some embodiments, the system (e.g., system 100 of FIG. 1) is configured to detect, e.g., based on computer vision or other sensors and/or techniques, that a bin is empty, and to clear the bin from the kitting machine or shelf by using a robotic arm to pick up the bin and place it in a corresponding empty bin location, e.g., a nearby stack of empty bins, etc. In some embodiments, automated bin clearing makes room from a next bin that is not empty to move into position on the kitting machine or shelf to enable a robotic arm to access and pick up items from the bin.

Figure 2A:
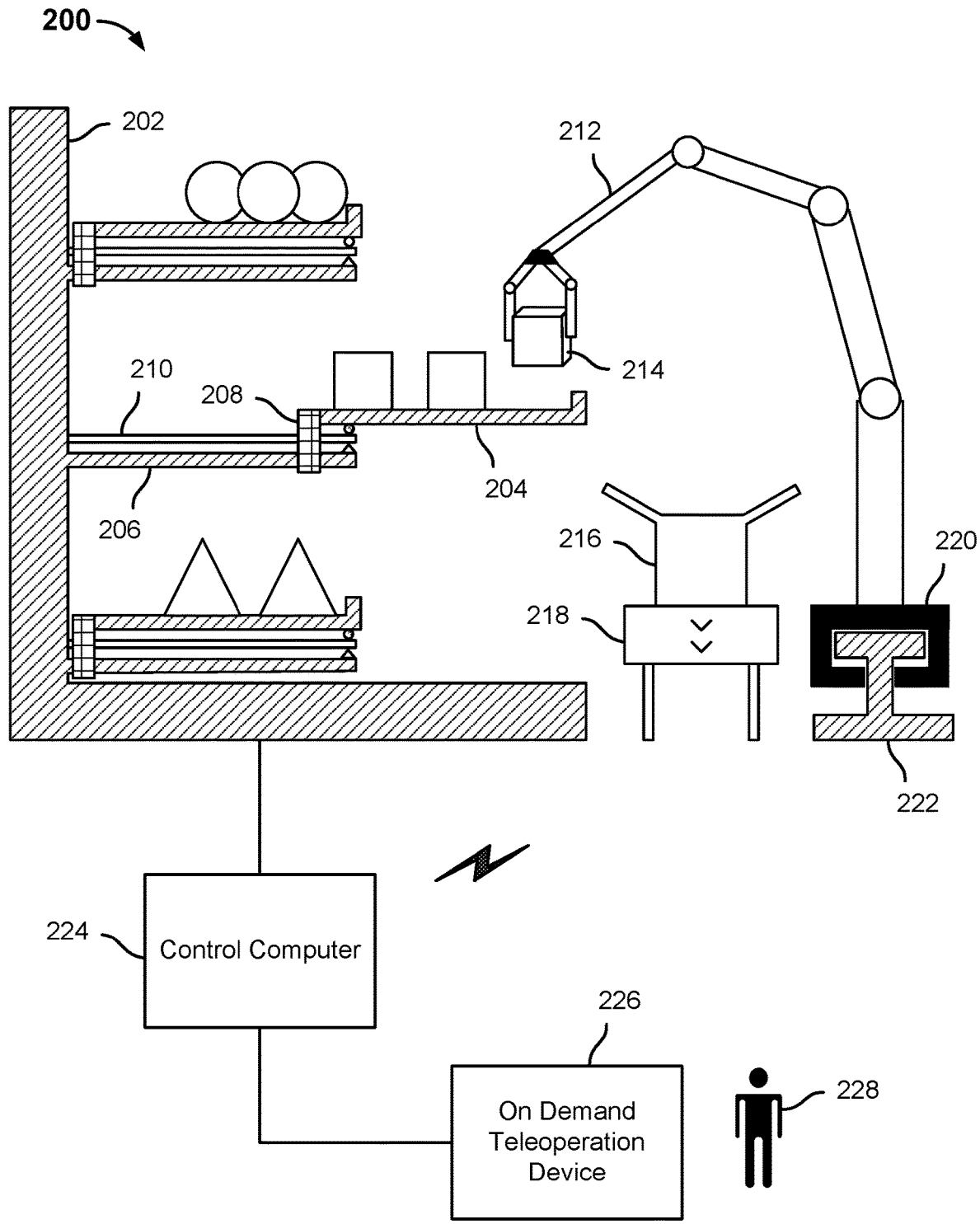
FIG. 2A is a diagram illustrating an embodiment of a kitting system.

FIG. 2A is a diagram illustrating an embodiment of a kitting system. In the example shown, kitting system 200 includes kitting machine 202 comprising a plurality of shelves each having an upper tray or pickup area capable of being extended to facilitate retrieval of an item on the upper tray or pickup area being retrieved by a robotic arm or other robotic manipulator, e.g., by being picked up from above without interference from other shelves above the one that has been extended. If the state as shown in FIG. 2, for example, upper tray 204 of shelf 206 has been extended by controlled operation of a motorized linear bearing (or other linear drive) 208 along a guide shaft (or rail) 210.

In the example shown, robotic arm 212 is picking up item 214 from extended upper tray 204. Extending tray 204 to the position shown makes it possible for robotic arm 212 to pick item 214 up from an overhead position, which in many cases increases the options and strategies available to use robotic arm 212 to pick the item 214 up. In this example, robotic arm 212 is being used to add item 214 to box 216, which has be positioned by box conveyor 218 to a position in front of kitting machine 202. Robotic arm 212 has been moved into position in this example by operation of carriage 220 along rail 222.

In the example shown in FIG. 2A, kitting machine 202, specifically the elements 204, 206, 208, and 210 comprising the middle shelf of kitting machine 202; box conveyor 218; robotic arm 212; and carriage 220 have been operated in coordination under automated control by control computer 224, e.g., to position the upper tray 204 and robotic arm 212 to the positions shown, and to use the robotic arm 212 to retrieve item 214. In various embodiments, control computer 224 may be configured to determine a cooperative/combined strategy to optimally retrieve item 214 and other items, if any, to be packed in box 216. For example, control computer 224 may be configured with spatial and operational models of kitting machine 202, robotic arm 212 as movable along rail 222 by operation of carriage 220, box conveyor 218, etc. to determine a cooperative strategy to position box 216, robotic arm 212, and item 214 as disposed on upper tray 214, and use robotic arm 212 to retrieve item 214 and place item 214 in box 216. In some embodiments, control computer 224 may be configured (e.g. by software) to favor (e.g., ascribe a lower cost to) a solution which involves using robotic arm 212 to retrieve item 214 from above, e.g., from an extended upper tray 204, over a solution that would require robotic arm 212 to be used to reach into a recessed shelf that sits below a shelf located above the recessed shelf.

In the example shown, the shelves of kitting machine 202 are shown to be parallel to the ground, but in other embodiments one or more of the shelves may be tilted downward by an angle selected to cause (e.g. by gravity) or facilitate movement of items to the pickup zone at the rightmost end of the shelves as shown in FIG. 2A, i.e., the end nearest box conveyor 218 and rail 222. In various embodiments, the shelves of kitting machine 202 may be loaded with items from behind or the side, e.g., by human workers or other machines, not shown in FIG. 2. Items may be advanced to the pickup zone by gravity, facilitated by rollers, conveyor belts, and/or other devices. The height of the shelves may be adjusted in various embodiments, e.g., to accommodate larger or smaller items, as required. The tilt angle and/or other position attributes of the shelves may be adjusted in various embodiments, as required, e.g., to facilitate control advancement of items of different weight, shapes, bulk, etc. to the pickup zone.

In various embodiments, bar codes, other optical codes, radio frequency (RF) tags, computer vision, and/or other techniques may be used by the kitting system 202, e.g., by control computer 224, to determine which items are on which shelves of kitting machine 202, to determine when to advance (more) items to the pickup zone and/or prompt restocking, etc.

Referring further to FIG. 2A, if the kitting system 202 gets stuck in a state in which control computer 224 determines it has no (further) strategy to proceed, control computer 224 is configured to initiate teleoperation via on demand teleoperation device 226 operated by human operator 228. As noted above in connection with FIG. 1, in some embodiments control computer 224 may be configured to resume fully automated processing, e.g., upon being instructed by the human operator 228 to resume or attempt to resume automated operation, and/or based on a determination by control computer 224 that it once again has available one or more strategies to resume automated operation, etc.

Figure 2B:
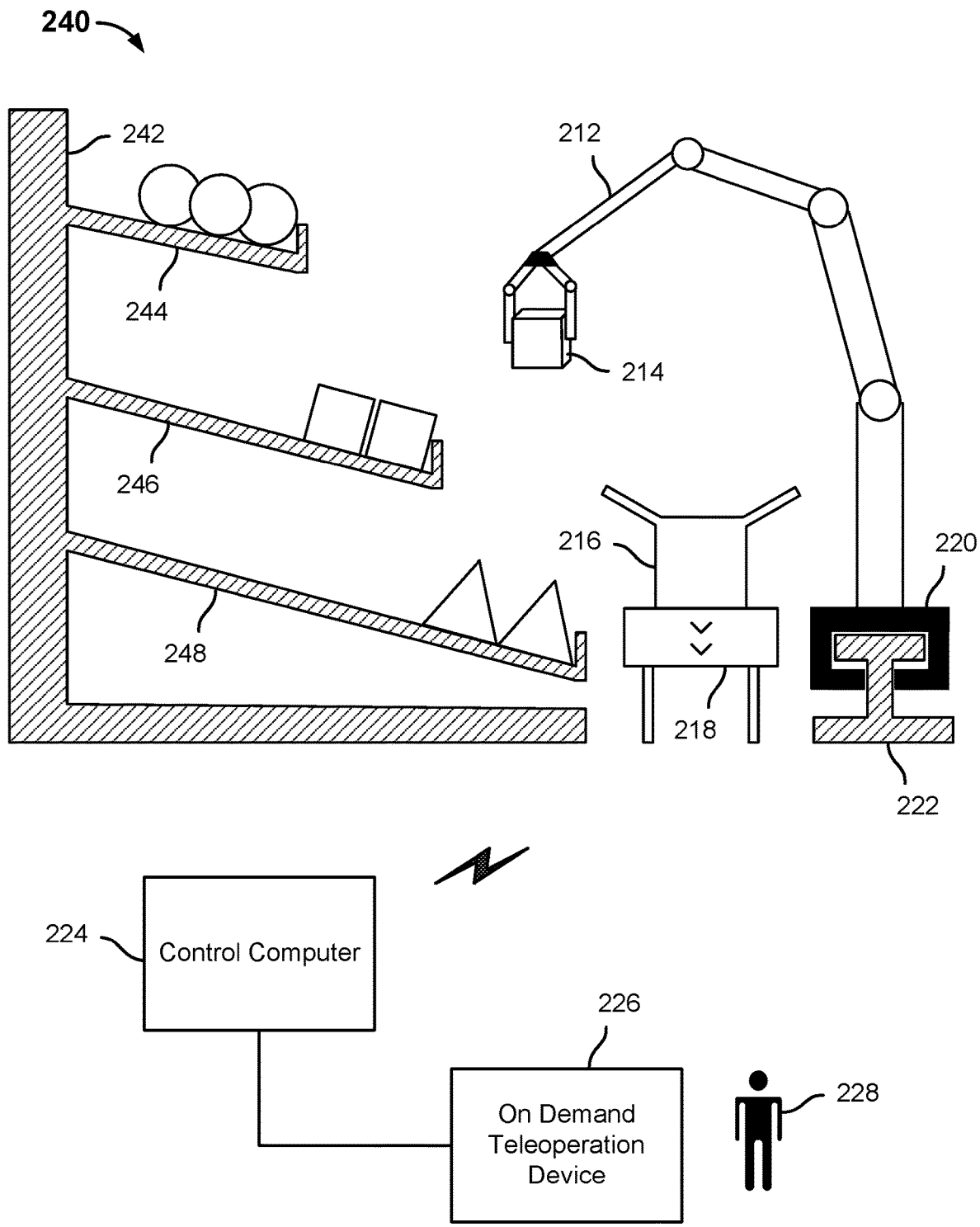
FIG. 2B is a diagram illustrating an embodiment of a kitting system.

FIG. 2B is a diagram illustrating an embodiment of a kitting system. In the example shown, kitting system 240 includes many components present in the kitting system 200 of FIG. 2A, except that the kitting machine 202 has been replaced by a kitting shelf module 242 comprising a plurality of staggered, sloped shelves 244, 246, and 248. In the example shown, items are gravity fed to a pick up region of the respective shelves 244, 246, and 248. In some embodiments, the shelves may comprise rollers, belts, or other mechanisms to facilitate or assist the gravity feeding of items to the respective pick up regions of the shelves 244, 246, and 248. In this example, the staggering of the shelves 244, 246, and 248 results in the respective pick up region of each being accessible to overhead pick up by robotic arm 212 and gripper 214, without obstruction, for example, by a shelf above.

In the example shown in FIG. 2B, the kitting shelf module 242 may not have any robotic or other control mechanisms to be controlled by computer 224. In some embodiments, control computer 224 may be configured to receive via wired and/or wireless connection sensor output from sensors comprising or otherwise associated with the kitting shelf module 242, such as weight sensors, scanners, cameras, etc., and may be configured to use such sensor data to coordinate operation of other components of system 240 to locate, pick up, and pack items on shelves 244, 246, and/or 248, as applicable, into boxes such as box 216.

Figure 3:
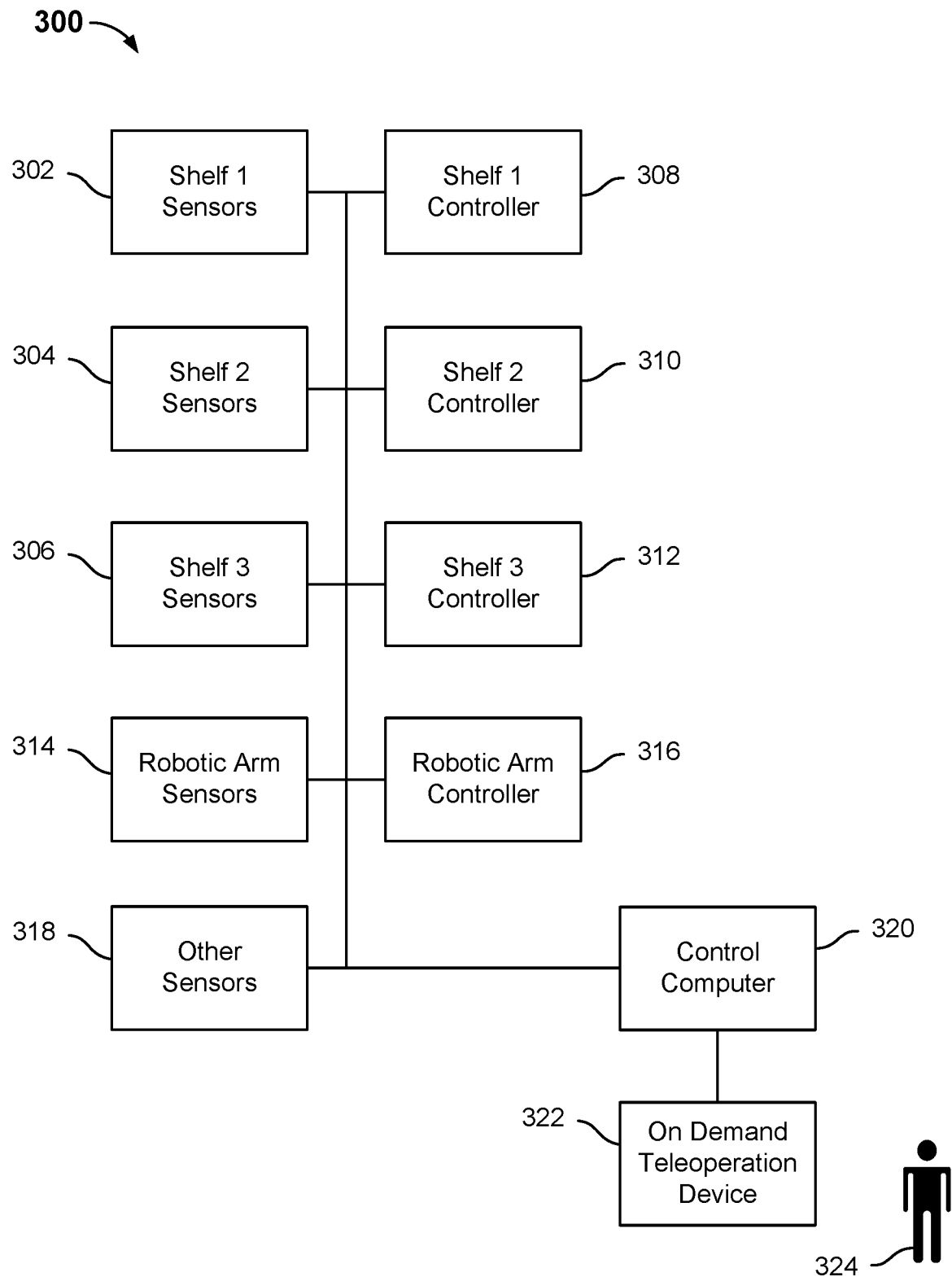
FIG. 3 is a block diagram illustrating an embodiment of a kitting system.

FIG. 3 is a block diagram illustrating an embodiment of a kitting system. In various embodiments, kitting system 300 of FIG. 3 represents operational elements and the network connections between them to implement a kitting system such as system 200 of FIG. 2. In the example shown, kitting system 300 includes a plurality of sets of shelf sensors 302, 304, 306, each associated with a corresponding shelf comprising a kitting machine, such as kitting machine 202 of FIG. 2. Examples of shelf sensors 302, 304, and 306 include, in various embodiments and without limitation, cameras, optical scanners, and other optical sensors; pressure sensors, weight sensors, limit switches, and other contact sensors; etc. Sensors 302, 304, and 306 may be configured to generate sensor output data to be used, in various embodiments, to determine the presence, absence, quantity, type, nature, attributes, orientation, and/or other data associated with items the corresponding shelf has been stocked with and/or is otherwise associated with.

Each set of sensors 302, 304, and 306, is associated with a corresponding shelf controller 308, 310, and 312, respectively. Each shelf controller 308, 310, and 312 is configured, in various embodiments, to be used to control the components comprising the shelf, such as to extend the shelf or an upper tray thereof, as in the example shown in FIG. 2, to adjust the tilt angle of the shelf, to operate a belt conveyor or other motive or propulsive force and/or instrumentality of the shelf configured to position and/or orient items on the shelf to position them for pickup, etc.

System 300 further includes robotic arm sensors 314 and robotic arm controller 316. In various embodiments, robotic arm sensors 314 may include one or more cameras, pressure sensors, weight sensors, robotic arm segment position sensors, etc. In various embodiments, robotic arm controller 316 may be used to operate an associated robotic arm, e.g., to reposition the robotic arm to a position from which it can retrieve an item, to pick the item up, to move the item to a box, conveyor, or other destination, etc.

System 300 includes others sensors 318, which may include other sensors in the environment in which the system 300 operates, such as a camera mounted in the environment, e.g., camera 124 of FIG. 1.

In the example shown, control computer 320 is connected via a network (e.g., wifi, peer-to-peer, etc.). In various embodiments, control computer 320 is configured to use sensor data generated by the shelf, robotic arm, and other sensors, 302, 304, 306, 314, and 318, to determine and implement a strategy to complete a kitting task, e.g., by controlling the operation one or more shelves and the robotic arm via commands sent via the network to the respective shelf controllers 308, 310, and/or 312 and robotic arm controller 316.

In the example shown, control computer 320 is connected via a network connection to on demand teleoperation device 322, which is configured to be used by human operator 324, as required, to intervene to help complete a kitting task, as described above.

Figure 4:
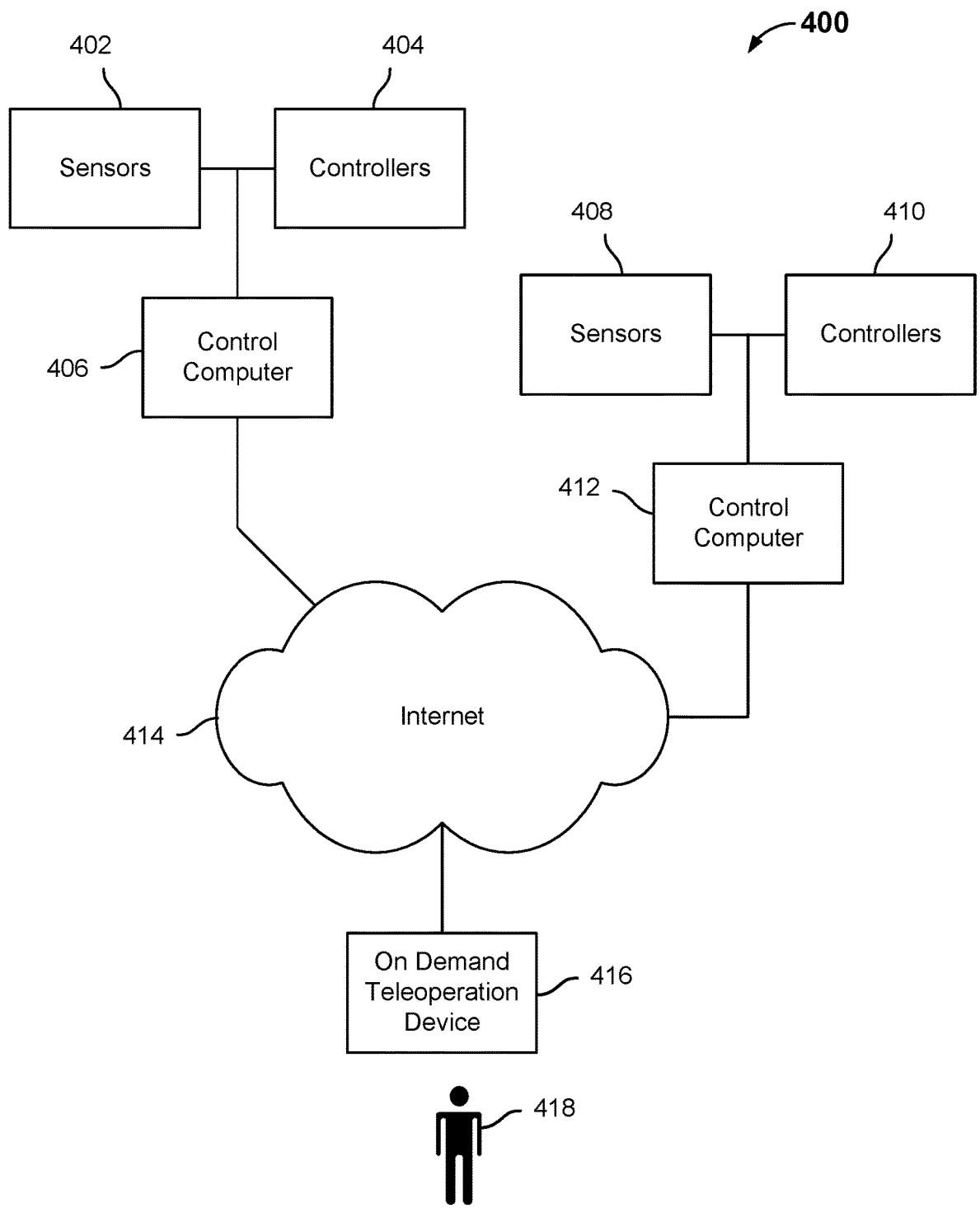
FIG. 4 is a diagram illustrating an embodiment of a kitting system.

FIG. 4 is a diagram illustrating an embodiment of a kitting system. In the example shown in FIG. 4, kitting system 400 includes a plurality of kitting systems, each located at a different physical site. For example, a first kitting system comprising sensors 402, controllers 404, and control computer 406 may be located at a first physical site, and a second kitting system comprising sensors 408, controllers 410, and control computer 412 may be located at a second physical site. Both control computers 406, 412 are connected via the Internet (and/or one or more other networks) 414 to a shared remote teleoperation site at which on demand teleoperation device 416 is configured to be used by a human operator 418 to perform teleoperation on demand, as and to the extent required by the respective kitting systems at the first physical site and the second physical site. In various embodiments, cameras or other sensors at a remote site at which teleoperation is to be performed may be used to provide a video feed and/or other information to the teleoperation device 416 via the Internet 414.

In various embodiments, each of a kitting system at each physical location may be configured to invoke on demand teleoperation under conditions described herein, e.g., upon determining no (further) strategy is available to continue/complete a current kitting operation or task. Each may send a request via the Internet 414 to obtain remote teleoperation via teleoperation device 416. In various embodiments, multiple concurring calls for on demand teleoperation may be address based on priority, e.g., as determined by the human operator 418, based on automatically assigned severity/importance scores, etc.

While two kitting systems at two different locations are shown in FIG. 4 by way of example as being served by a single remote on demand teleoperation site, in various embodiments any arbitrary number of kitting systems and/or kitting machines as disclosed herein may be associated with one or more remote (or local) teleoperation sites and/or services, such as the service available from teleoperation device 416 and human operator 418 in the example shown.

Figure 5:
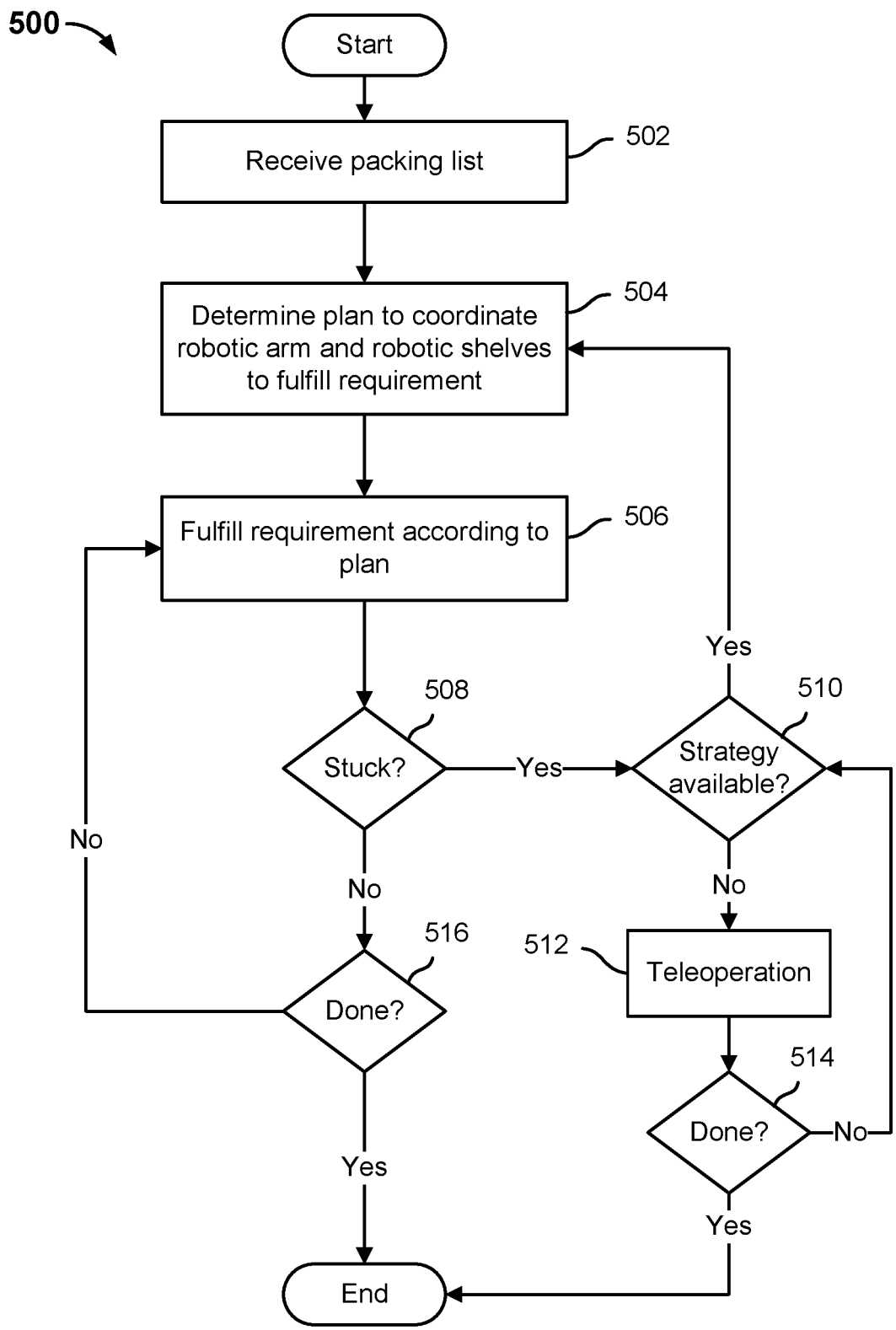
FIG. 5 is a flow chart illustrating an embodiment of a process to perform a kitting operation.

FIG. 5 is a flow chart illustrating an embodiment of a process to perform a kitting operation. In various embodiments, a computer, one or more computers, and/or one or more controllers may be configured, e.g., via software, to perform the process 500. For example, control computer 122 of FIG. 1, control computer 224 of FIG. 2, control computer 320 of FIG. 3, control computers 406 and 412 of FIG. 4, and/or other control computers and/or controllers described herein may be configured, in various embodiments, to perform process 500.

Referring to FIG. 5, a packing list is received (502). A plan is determined to operate a robotic arm and one or more robotic shelves and/or other elements of a kitting machine as disclosed herein to fulfill a requirement associated with the packing list (504). For example, if the packing list (502) indicates a list of items and a quantity of each to be included in a kit, box, or other container or set, a plan is determined to locate, retrieve, and pack into the kit, box, or other container or set, the required items in the required quantities. Once the plan has been determined (504), or in some embodiments as soon as at least a first portion of the plan has been determined, the system begins (continues, or resumes) to fulfill the requirement according to the plan (506).

If the system becomes "stuck" (508), e.g., the next task to be completed according to the currently-selected strategy to complete the task, such as picking up a next item to be packed, then the system determines whether an alternate strategy is available to it (510). For example, the system may consider alternate strategies such as using an alternate grip; approaching the item from a different angle; agitating and/or repositioning the item using the robotic arm/gripper, such as by nudging it; agitating and/or repositioning the item using the robotic shelf, such as by operating a conveyor in a reverse direction, using a shelf motor to shake or otherwise agitate the shelf, etc.; and/or swapping out the gripper for another robotic arm terminal segment or using the gripper to grasp a tool to be used to pick up the item.

If an alternate strategy is determined to be available (510), a revised plan that relies on that strategy is determined and implemented to (attempt to) continue to fulfill the requirement (504, 506). In various embodiments, if multiple alternative strategies are available, a most promising one of them, e.g., as determined by respective confidence scores or other basis of ranking them, is selected to be tried next.

If it is determined that no alternative strategy is available (510) and/or a task cannot be completed after a configured, learned, and/or otherwise prescribed number of attempts, an unexpected obstacle or condition has been encountered (e.g., an empty shelf), etc., the system invokes on demand teleoperation (512) as described herein. If the kitting operation is completed by teleoperation (514), the process ends. If during teleoperation (512, 514) the system determines it has a strategy available to resume automated fulfillment of the requirement (514, 510), the system resumes automated operation by determining/updating a plan to complete the remaining actions required to fulfill the requirement and implements the plan (504, 506). The system continues automated operation until the requirement has been fulfilled, either by automated operation (516) or teleoperation (514).

Figure 6:
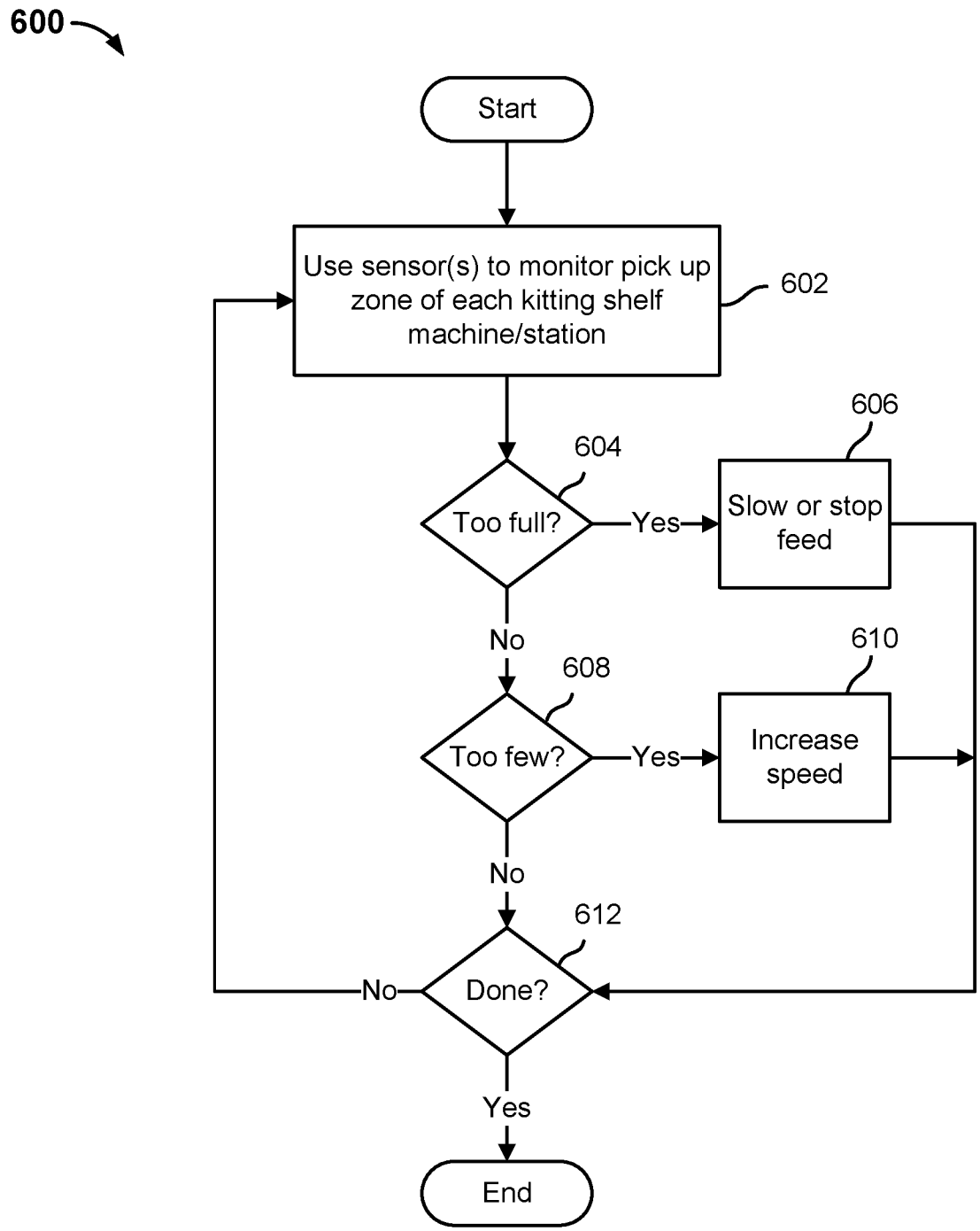
FIG. 6 is a flow chart illustrating an embodiment of a process to perform a kitting operation.

FIG. 6 is a flow chart illustrating an embodiment of a process to perform a kitting operation. In various embodiments, process 600 may be implemented by one or more control computers and/or kitting machine controllers. In some embodiments, a kitting machine operates under supervisory control by a control computer configured to use the kitting machine to perform kitting operations, but the kitting machine performs all or part of the process 600 autonomously to ensure a correct supply of items via its shelf(s), bin(s), and/or other item inventory, supply, and/or pickup areas. In the example shown, sensors are used to monitor one or more pickup zones, e.g., pickup zones of a kitting machine as disclosed herein (602). For example, computer vision, weight sensors, RF tags, etc. may be used to determine or estimate the number of items in the monitored area. If the monitored area becomes too full (604), the feed of items to the area is slowed or stopped (606). For example, a conveyor belt supplying the area may be slowed or stopped, a human or machine loading items into the loading end of the shelf, conveyor, etc. may be signaled to stop or slow down, etc. If too few items are detected in the monitored area (608), the rate of supply is increased (610), e.g., by increase a conveyor belt speed, increasing an angle of tilt (gravity feed), loading items more quickly, etc. Monitoring and adjustments continue, as described, to maintain availability of the item in the monitored area in/within desired quantities until the operation is done (612).

Figure 7A:
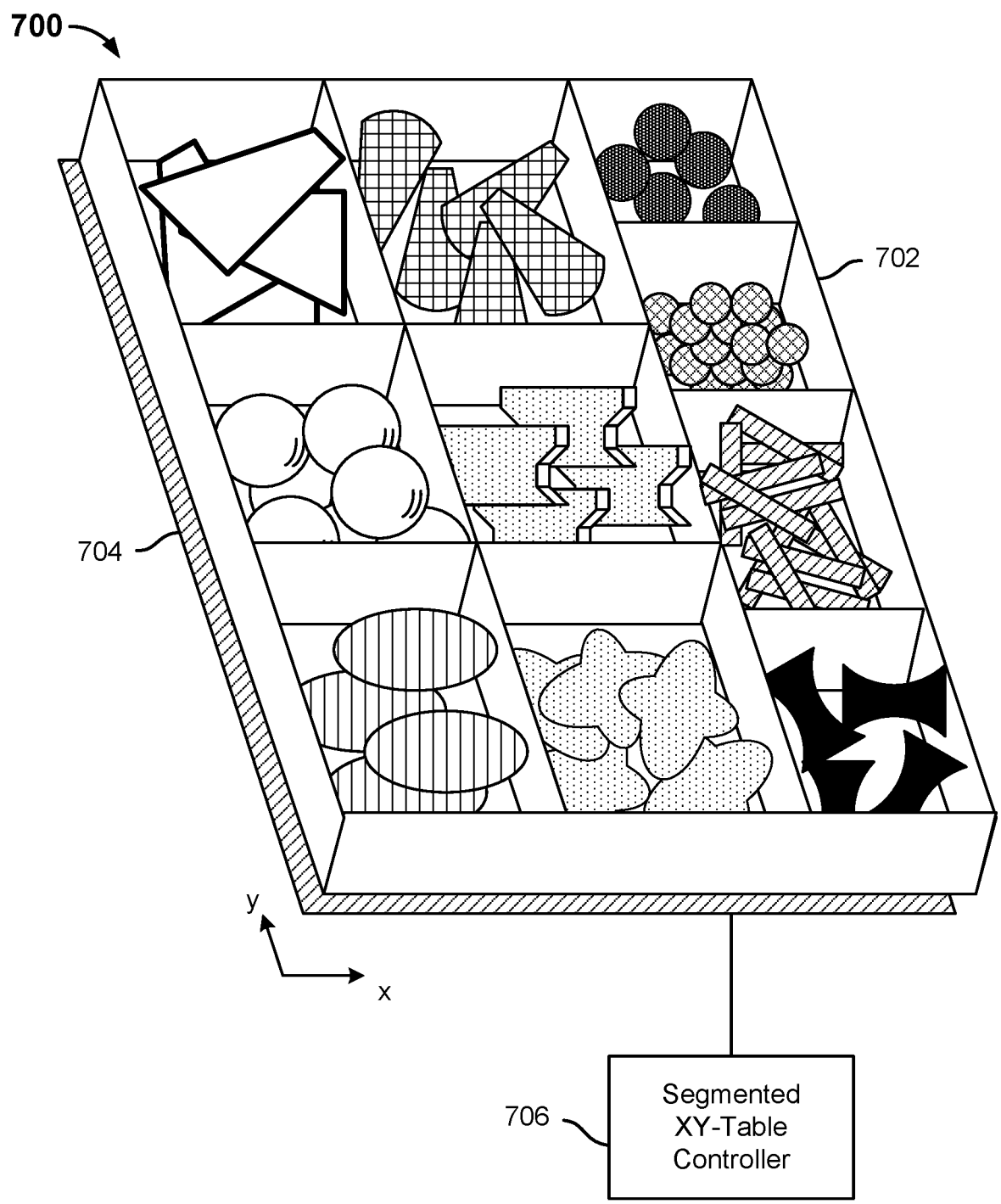
FIG. 7A is a diagram illustrating an embodiment of a kitting machine.

FIG. 7A is a diagram illustrating an embodiment of a kitting machine. In various embodiments, a kitting machine such as kitting machine 700 of FIG. 7A may be used in addition to and/or in place of the kitting machines illustrated in FIGS. 1 and 2, for example. In the example shown, kitting machine 700 includes a large compartmentalized bin 702 disposed on a base 704 via an XY-table mechanism configured to move the compartmentalized bin 702 in the x- and y-directions under control of XY-table controller 706. For example, linear motors disposed in the x- and y-directions, as shown, (the motors not being shown in FIG. 7A) may be operated under control of segmented XY-table controller 706 to position a given bin of items in a desired location, e.g., in a position opposite a robotic arm from which the robotic arm can reach an item in a corresponding bin so positioned.

Figure 7B:
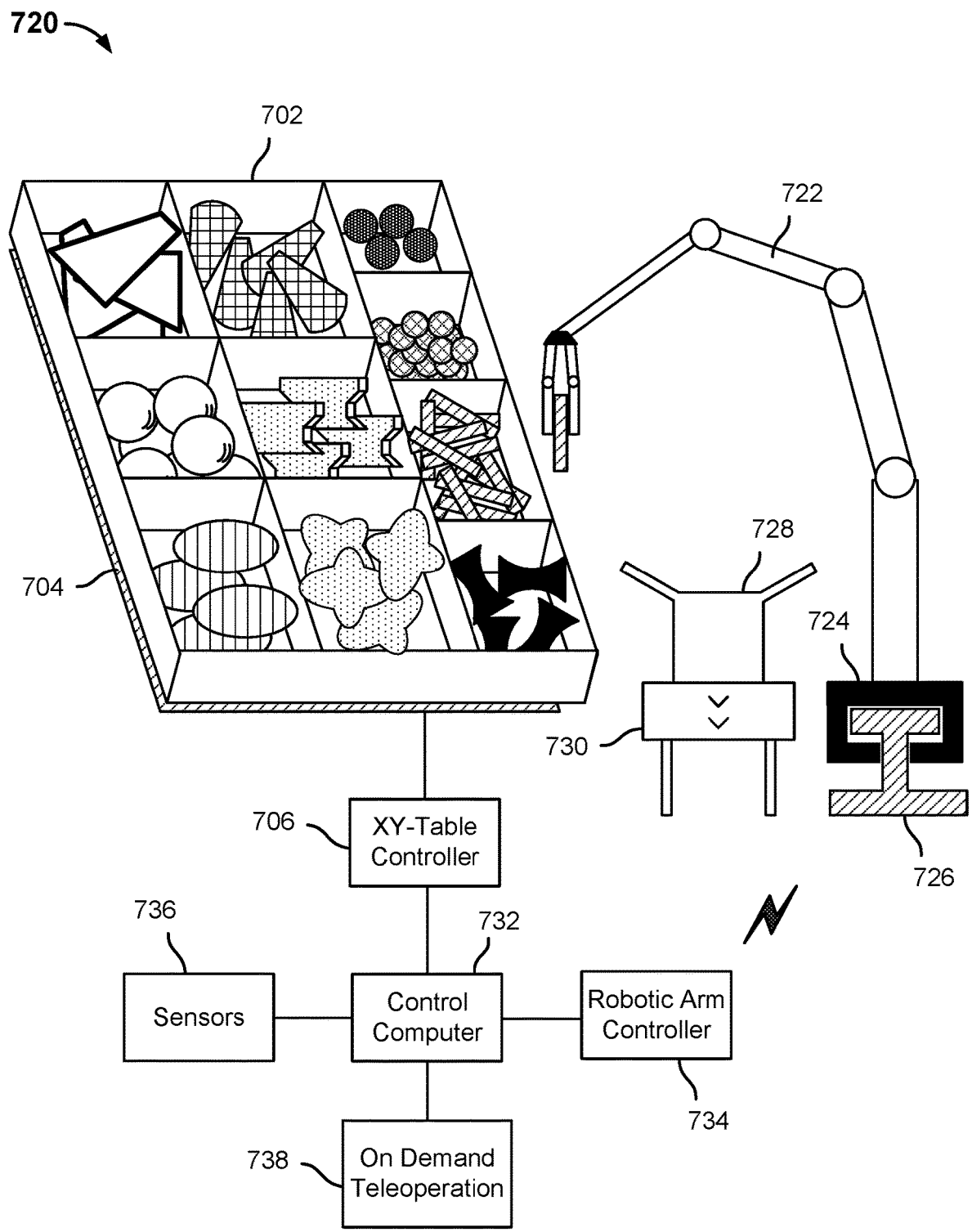
FIG. 7B is a diagram illustrating an embodiment of a kitting system comprising the kitting machine of FIG. 7A.

FIG. 7B is a diagram illustrating an embodiment of a kitting system comprising the kitting machine of FIG. 7A. In the example shown, kitting system 720 includes the kitting machine 700 of FIG. 7A. In addition, kitting system 720 includes a robotic arm 722 mounted on a chassis 724 configured to be moved along rail 726 to a desired position opposite the kitting machine 700 and specifically compartmentalized bin 702, e.g., under control of control computer 732. In the example shown, control computer 732 has operated the kitting shelf table 700 via controller 706 to position a desired bin comprising compartmentalized bin 702 in a desired location to enable robotic arm 722, positioned and operated via controller 734, to be used to pick up the item shown from its corresponding bin. In the example shown, sensors 736 provide sensor output that may be used by control computer 732 to position the compartmentalized bin 702 and robotic arm 722, 724 as determined to be required to pick up the item. If the system 720 gets stuck and has no (further) strategy to proceed, teleoperation may be initiated via on demand teleoperation module/device 738.

Figure 8A:
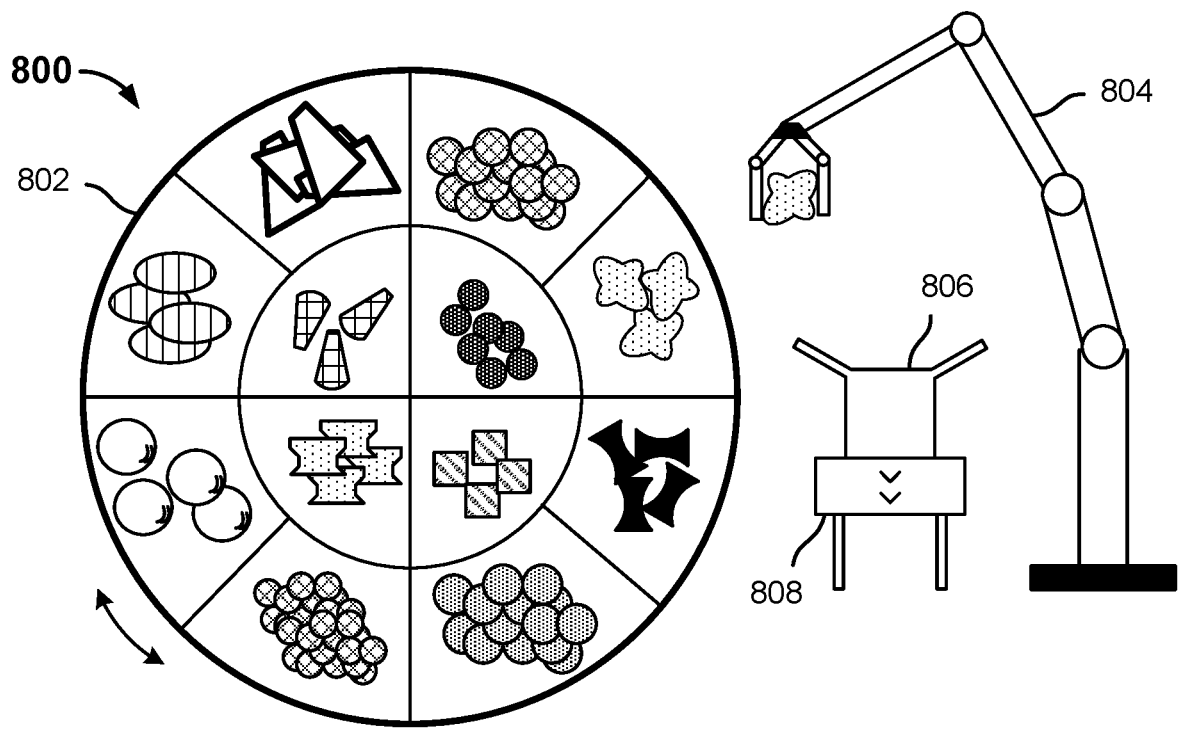
FIG. 8A is a diagram illustrating an embodiment of a kitting machine.

FIG. 8A is a diagram illustrating an embodiment of a kitting machine. In the example shown, kitting system 800 includes a kitting machine 802 comprising a compartmentalized circular turntable 802. While the XY-table type kitting machine 700 of FIGS. 7A and 7B translates in the x- and y-directions, via linear motors oriented in the x- and y-directions, operated via one or more motor controllers controlled by a control computer, as described above, the compartmentalized turntable of kitting machine 802 in various embodiments is rotated by a rotary motor to a position that places a desired bin associated with a desired item in a position within reach of robotic arm 804, which may then be used to retrieve the desired item and place it in a destination, such as box 806 on box conveyor 808 in the example shown.

Figure 8B:
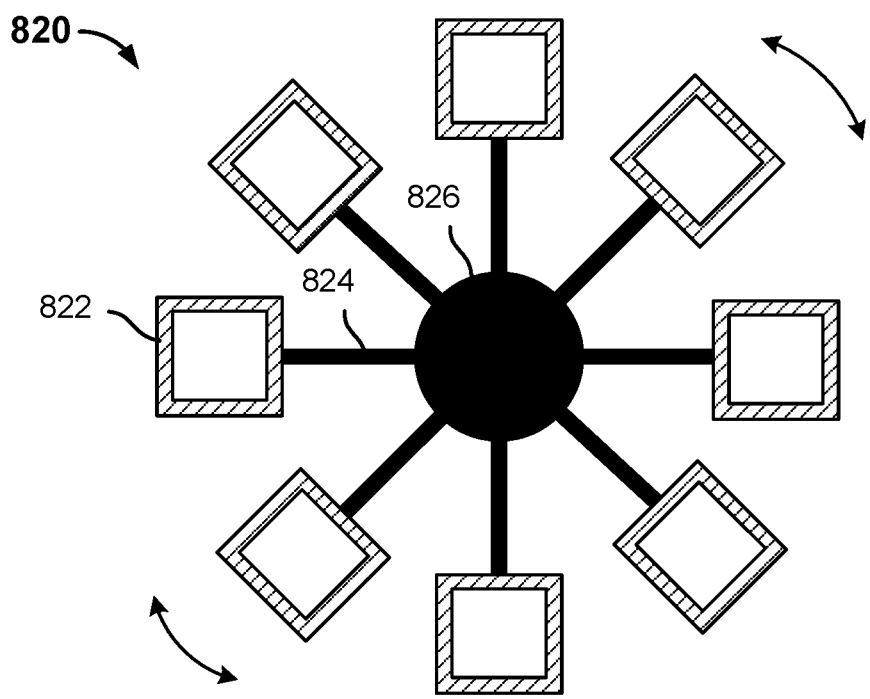
FIG. 8B is a diagram illustrating an embodiment of a kitting machine.

FIG. 8B is a diagram illustrating an embodiment of a kitting machine. In the example shown, kitting machine 820 comprises a plurality of bins, such as bin 822, each disposed at a distal end of an arm radiating from a central hub, e.g., arm 824 radiating from hub 826. A motor rotates the hub 826 to a desired position, under control of a motor controller and/or control computer, to position a desired bin (e.g., bin 822) containing a desired item in a position within reach of a robotic arm (not shown), to enable the robotic arm to retrieve an item from the bin.

Figure 9:
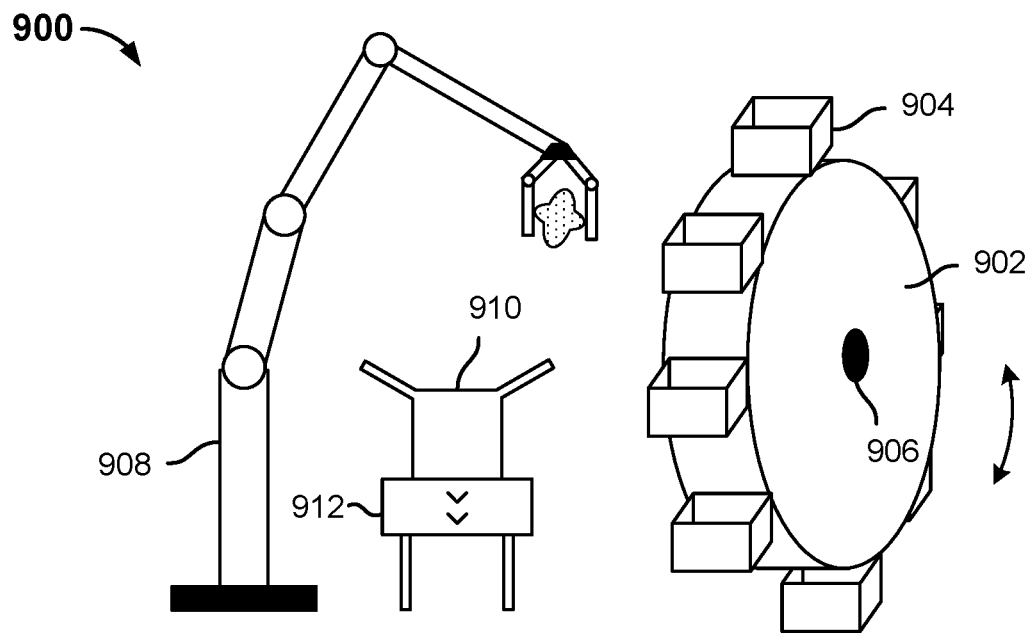
FIG. 9 is a diagram illustrating an embodiment of a kitting machine.

FIG. 9 is a diagram illustrating an embodiment of a kitting machine. In the example shown, kitting system 900 includes a kitting machine 902 comprising an upright wheel-like cylindrical body (or frame) having a plurality of bins, such as bin 904, affixed to and/or suspended from an outer perimeter of the cylindrical body (or frame), similarly to cars of a Ferris wheel. The kitting machine 902 is configured to be rotated about a central axis 906 to position a desired bin, e.g., bin 904, in a position within reach of robotic arm 908, which in the example shown has retrieved an item from a corresponding bin for placement in a box 910 on box conveyor 912.

Figure 10:
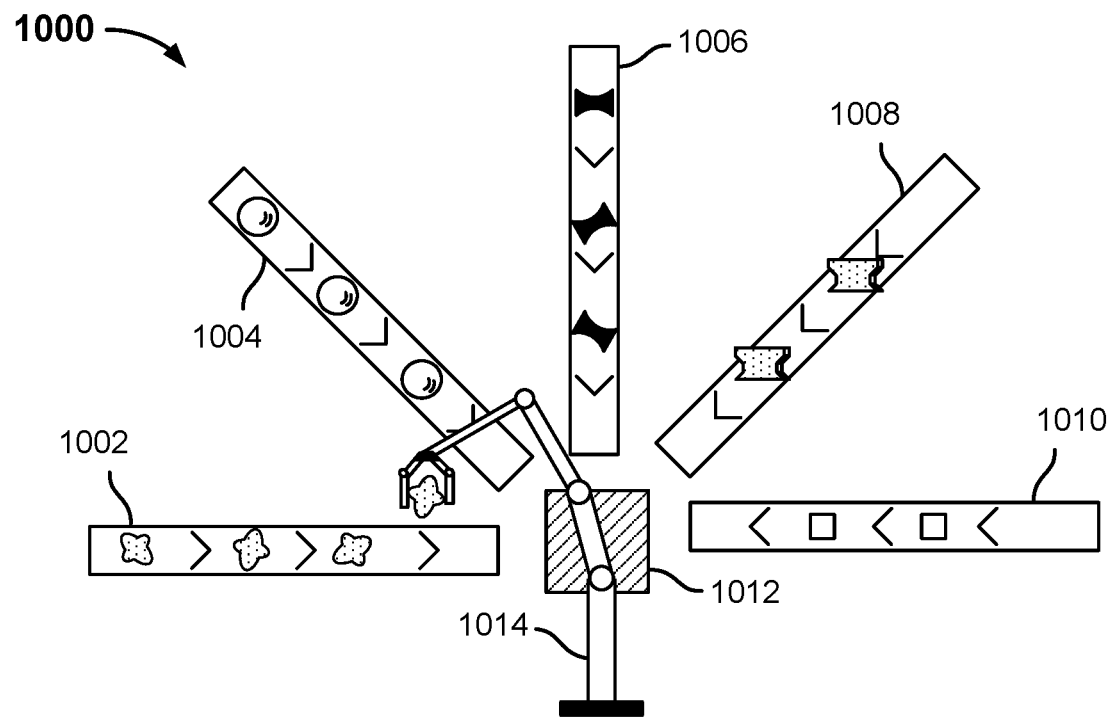
FIG. 10 is a diagram illustrating an embodiment of a kitting system.

FIG. 10 is a diagram illustrating an embodiment of a kitting system. In the example shown, kitting system 1000 includes a plurality of kitting machines 1002, 1004, 1006, 1008, and 1010, arranged to deliver items to a common central destination at which a robotic arm 1014 is located and configured to pick and place items, e.g., according to a packing list, in box 1012. In some embodiments, robotic arm 1014 may be on a vehicle or rail-borne chassis and may be move, in some embodiments carrying box 1012, from one set of kitting machines, such as kitting machines 1002, 1004, 1006, 1008, and 1010, to another set arranged in a similar manner in a nearby location, e.g., to retrieve and pack additional items.

While specific kitting machines each having a variety of shared and some distinct attributes have been described and illustrated herein, in various embodiments, a kitting system as disclosed herein may include one or more kitting machines configured other than as specifically illustrated herein by way of example, which may provide was to position or reposition items for retrieval and kitting as described herein other than via the specific mechanisms described at length. A kitting machine within the scope of the present disclosure may provide any one or more ways to position or reposition an item for pickup under control of an onboard, nearby, or remote controller and/or control computer, as disclosed herein.

In various embodiments, kitting machines of any type disclosed herein may be used to perform a kitting operation, such as to fulfill an order, by using the capabilities of one or more kitting machines and one or more robotic arms or other robotic retrieval devices to position items on the kitting machine(s) in a position within reach of the robotic arms or other robotic retrieval devices, to enable required items to be retrieved and placed in a box or other container or destination.

Figure 11:
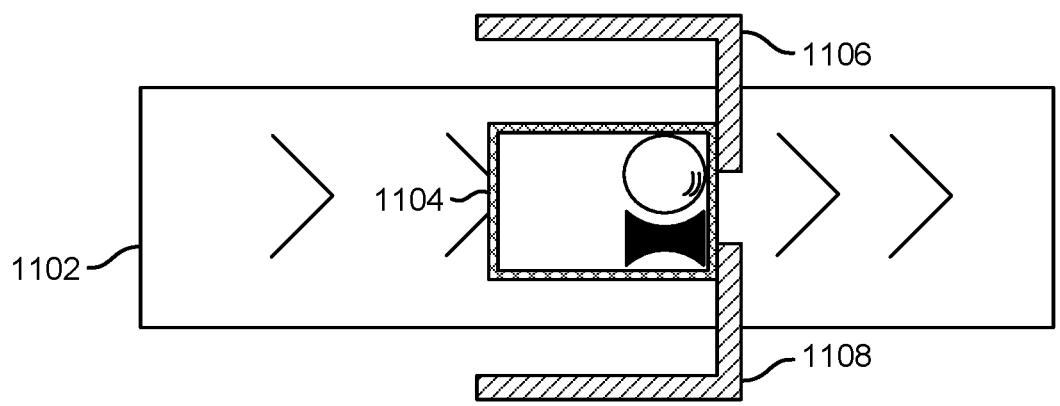
FIG. 11 is a diagram illustrating an embodiment of a retractable box restraint system.

FIG. 11 is a diagram illustrating an embodiment of a retractable box restraint system. In various embodiments, a box restraint system as shown in FIG. 11 may be used to hold a box in place while a kitting system as disclosed herein packs the box with items. In the example shown, retractable restraints 1106 and 1108 have been moved into a position to restrain box 1104. In various embodiments, in the position shown retractable restraints 1106 and 1108 may provide a backstop to enable a robotic arm to be used to pack items more tightly and/or precisely in box 1104, e.g., as shown. In various embodiments, a control computer as described herein uses conveyor 1102 to advance box 1104 to the location shown and causes the retractable restraints 1106 and 1108 to move into the restraining position, as shown. When packing is completed at the position as shown, the control computer retracts the retractable restraints 1106 and 1108 and operates conveyor 1102 to advance box 1104 to a next location.

Figure 12A:
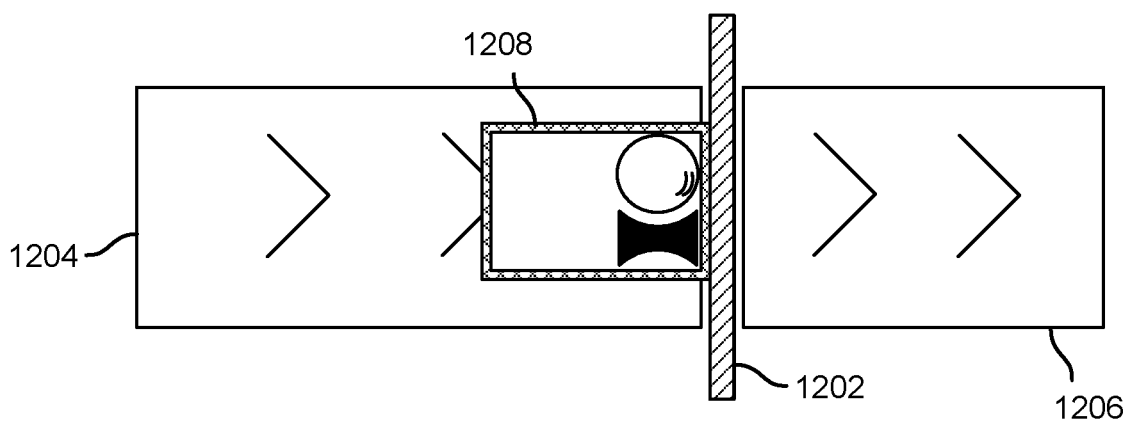
FIG. 12A is a diagram illustrating an embodiment of a retractable box restraint.

FIG. 12A is a diagram illustrating an embodiment of a retractable box restraint. In the example shown, a vertically-retractable barrier 1202 has been deployed (inserted) between a first conveyor segment 1204 and a second conveyor segment 1206, to restrain box 1208 in the position shown. In various embodiments, a control computer as described herein uses conveyor 1204 to advance box 1208 to the location shown and causes the vertically-retractable barrier 1202 to move into the restraining position, as shown. When packing is completed at the position as shown, the control computer retracts the vertically-retractable barrier 1202 and operates conveyors 1204 and 1206 to advance box 1208 to a next location.

Figure 12B:
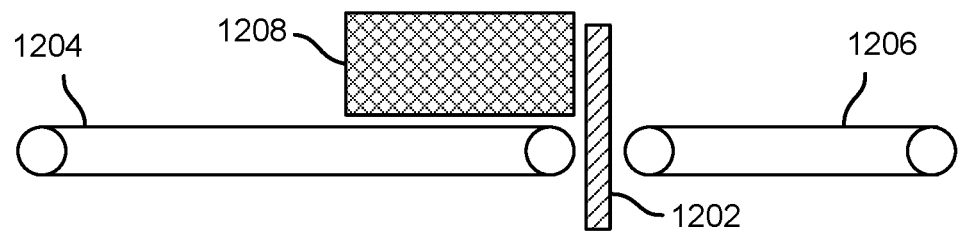
FIG. 12B is a diagram illustrating operation of the retractable box restraint of FIG. 12A.
Figure 12B:
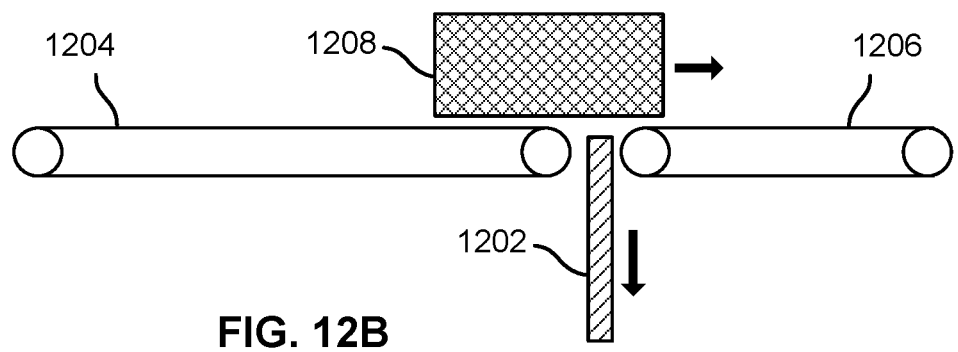

FIG. 12B is a diagram illustrating operation of the retractable box restraint of FIG. 12A. In the upper image, the vertically-retractable barrier 1202 is shown in the deployed or restraining position. In the position shown in the upper image, the vertically-retractable barrier 1202 is in position to be used as a backstop to enable a robotic arm to more tightly and/or precisely pack items into box 1208. In the lower image, the vertically-retractable barrier 1202 has been retracted downward, allowing box 1208 to be advanced by operation of conveyors 1204 and 1206.

Figure 13A:
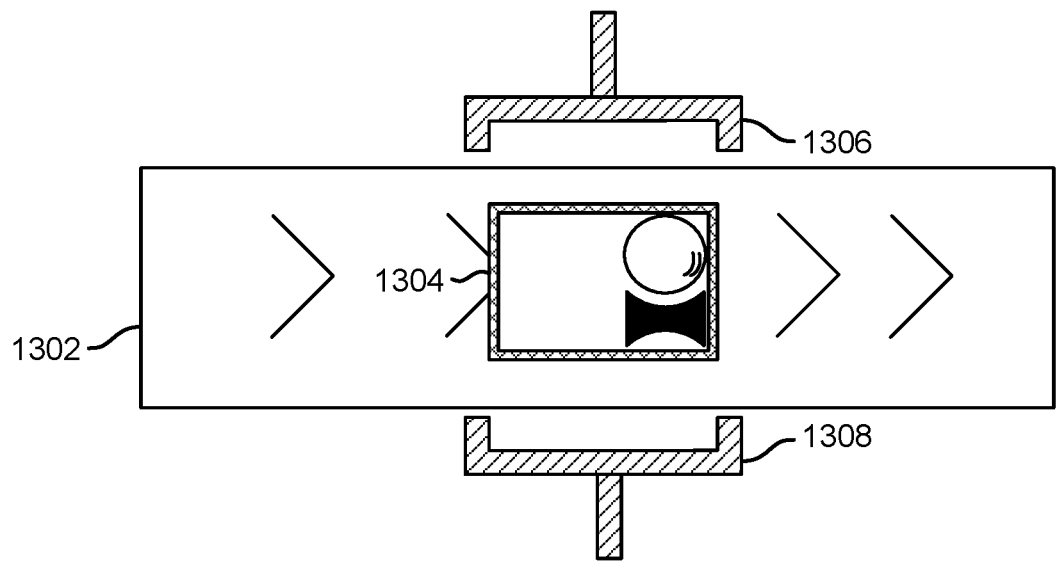
FIG. 13A is a diagram illustrating an embodiment of a retractable box restraint in a non-deployed position.

FIG. 13A is a diagram illustrating an embodiment of a retractable box restraint in a non-deployed position. In the example shown, conveyor 1302 has advanced box 1304 into a position to be loaded by a kitting machine and/or system as disclosed herein. Box restraints 1306 and 1308 on opposite sides of the box 1304 are shown in FIG. 13A in the retracted or non-deployed position, to allow the box 1304 to be moved into position.

In various embodiments, presence of the box 1304 in the loading position, as shown, is detected and/or reported to a control computer, which causes the box restraints 1306, 1308 to be deployed.

Figure 13B:
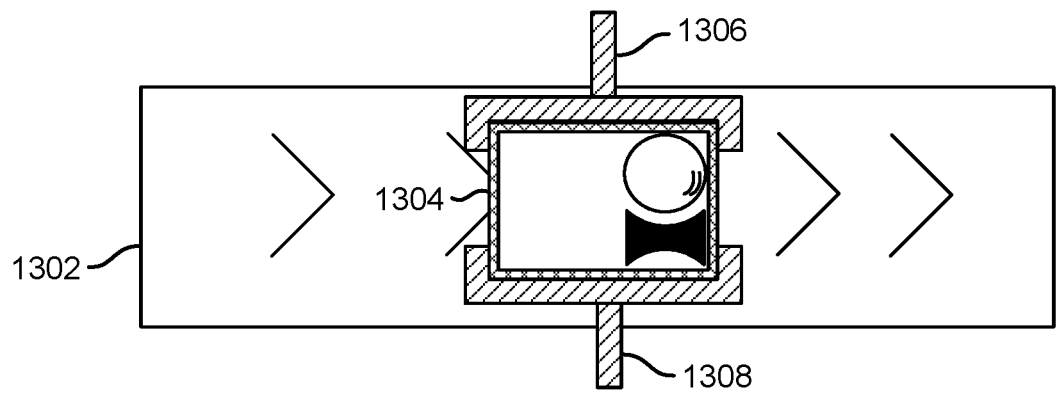
FIG. 13B is a diagram illustrating an embodiment of the retractable box restraint of FIG. 13A in a deployed position.

FIG. 13B is a diagram illustrating an embodiment of the retractable box restraint of FIG. 13A in a deployed position. In the position shown, the box restraints 1306 and 1308 prevent the box 1304 from moving in either the x-direction of the y-direction, holding the box 1304 firmly in place while being packed, e.g., by one or more robotic arms. The arm(s) can press items against the sides of box 1304 and/or against other items in box 1304 without moving the box from the position shown.

While in the examples shown in FIGS. 13A and 13B the box restraints 1306 and 1308 have a fixed width, in some embodiments the width is varied to accommodate and hold different sized boxes. In some embodiments, the width is adjusted dynamically, e.g., under control of a control computer, based on one or more sensors, etc., to securely grasp and hold in place a box of any size, e.g., within a design or supported range.

Figure 14:
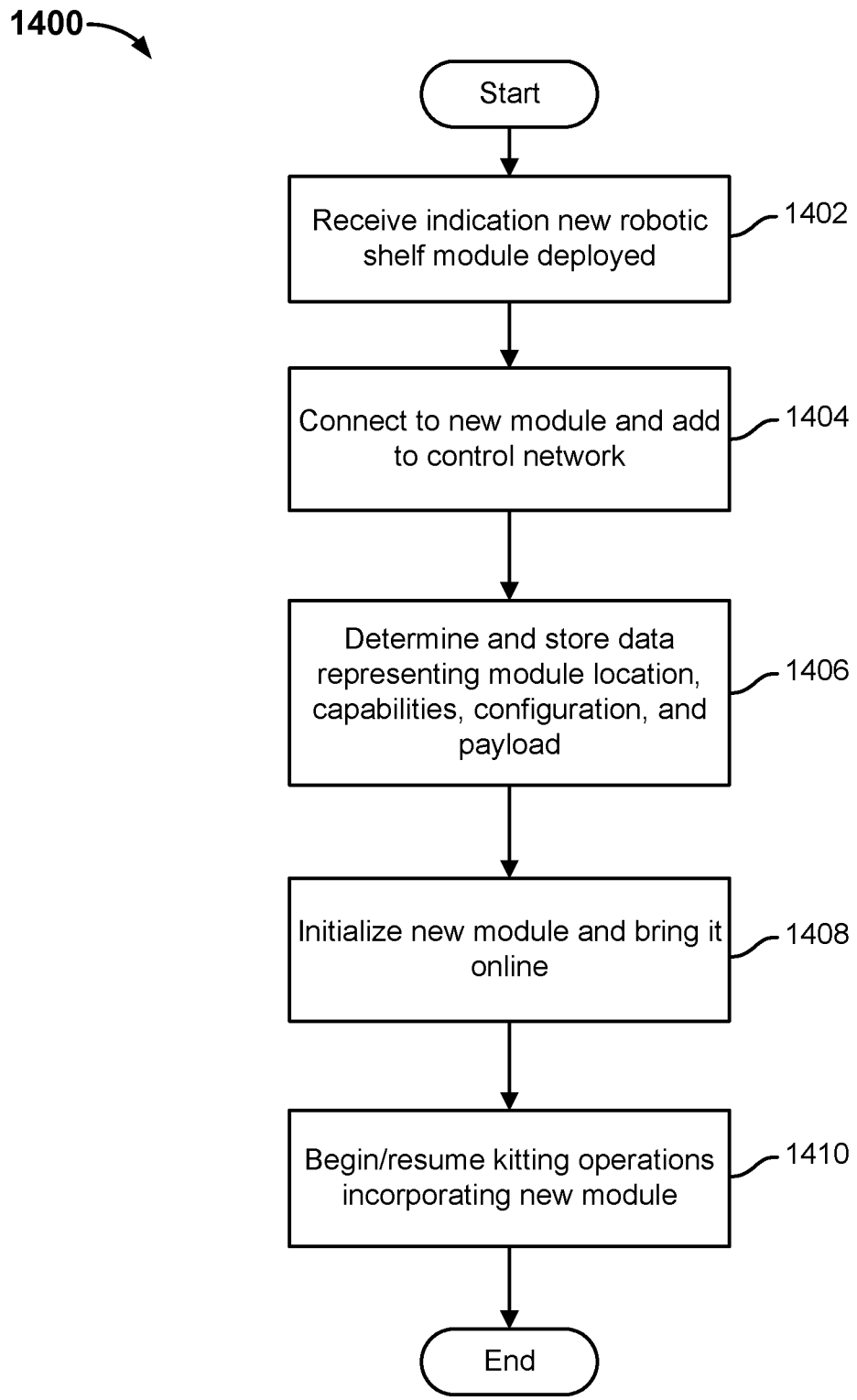
FIG. 14 is a flow chart illustrating an embodiment of a process to integrate a kitting machine or other module into a kitting operation.

FIG. 14 is a flow chart illustrating an embodiment of a process to integrate a kitting machine or other module into a kitting operation. In various embodiments, a kitting system as disclosed herein may include at any given time one or more operable kitting machines. Different types of kitting machine may be employed and mixed and matched. A varying mix of kitting machines may be used over time. For example, a first set of kitting machines may be used to pack a first array of items. Later, one or more machines, or the whole set, may be replaced by other machines optimized and configured to handle different items having different attributes. For example, a first kitting machine may be replaced by a second kitting machine optimized and configured to handle items that are larger or smaller, heavier or lighter, sturdier or more fragile, etc., than the machine that has been replaced. In some embodiments, a kitting machine may be deployed, added, etc., by placing the machine in or near a prescribed physical location, turning the machine on, and initiated initialization. For example, visible, electronic, or other marks painted or embodied in a floor of the kitting system location may be used to position machines. Sensors may be used by the kitting system to detect, determine the position of, connect to, establish control over, test, etc. a newly-deployed kitting machine.

In the example shown in FIG. 14, process 1400 may be performed by one or more of a controller, a kitting machine, and a control computer. In the example shown, an indication is received that a new robotic shelf module (e.g., kitting machine) has been deployed (1402). A connection to the new module/machine is established, and the new module/machine is added to a control network (1404). Data representing the module/machines location, capabilities, configuration, and payload is determined and stored (1406). For example, sensor data and/or a location sensing routine, such as using a robotic arm to determine location, may be used. In some embodiments, configuration data may be read from the module/machine, read from a file, disk, memory, or other storage location and/or determined (e.g., to an extent possible) by querying the new module/machine. Capability information, a spatial and/or operational model of the module/machine, etc., may be read from the machine, recalled from memory, obtained by a call to a remote database, etc. The new module/machine is initialized and brought online (1408). Initialization may include one or more of turning the machine on, switching from a standby to operational mode, establishing control over the machine, performing an operational test, and performing a test kitting operation using the new module/machine. Kitting operations are started/resumed, incorporating the new module/machine (1410).

In various embodiments, kitting systems comprising kitting machines as disclosed herein may be used to optimize and more fully automate kitting operations, e.g., by enabling items to be positioned (more) optimally to be retrieved and packed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    an actuator configured to move a surface or receptacle to a position associated with item retrieval;
    one or more cameras or sensors within an environment in which a robotic retrieval device operates to retrieve one or more items and pack the one or more items into a box or other container; and
    a first controller associated with the actuator;
    a second controller associated with the robotic retrieval device;
    a processor configured to:
        determine the one or more items to retrieve and pack into the box or other container, wherein determining the one or more items includes determining a location from which an item of the one or more items is to be retrieved, and determining one or more attributes associated with the item;
        obtain a plan to retrieve the item and to pack the item into the box or other container, wherein:
            the plan is based at least in part on the one or more items to be retrieved, the location from which the item is to be retrieved, and the one or more attributes associated with the item; and
            the plan includes a coordination of controlling the robotic retrieval device and the actuator so that the actuator moves the item to the position associated with item retrieval and the robotic retrieval device moves to retrieve the item from the position associated with item retrieval; and
        control the robotic retrieval device via the second controller and the actuator via the first controller at least in part by:
            using at least the robotic retrieval device to attempt to perform an individual task according to a first predefined strategy;
            in response to determining that the performing the individual task according to the first predefined strategy was attempted, determining whether the individual task was completed successfully according to the attempt to implement the first predefined strategy;
            in response to a determination by the processor that the individual task was not completed using the first predefined strategy:
                determining that a plurality of alternative strategies are available to perform the individual task;
                selecting a first alternative strategy to perform the individual task from the plurality of alternative strategies based on a respective confidence score associated with the first alternative strategy; and
                iteratively using at least the robotic retrieval device to perform the individual task according to the plurality of alternative strategies for the individual task until the earlier of (i) the individual task is completed, or (ii) a prescribed number of attempts have been performed, wherein the plurality of alternative strategies are iteratively used based on their respective confidence scores; and
            in response to a determination by the processor that the prescribed number of attempts have been performed, invoking a teleoperation for human intervention in which a user remotely controls the robotic retrieval device to perform the individual task.

2. The system of claim 1, wherein the processor is configured to:
    control the actuator via the first controller to position the item in the position associated with item retrieval; and
    control the robotic retrieval device via the second controller to retrieve the item from the position associated with item retrieval.

3. The system of claim 2, wherein the system further includes a conveyor configured to position the box or other container in a loading position and the processor is further configured to:
    control the conveyor to position the box or other container in the loading position;
    coordinate operation of the actuator and the robotic retrieval device to position the item in the position associated with item retrieval;
    use the robotic retrieval device to retrieve the item from the position associated with item retrieval; and
    use the robotic retrieval device to place the item in the box or other container.

4. The system of claim 1, wherein the one or more cameras or sensors comprises one or more of a camera or other image sensor, a weight sensor, a pressure sensor, a limit switch, and a contact sensor.

5. The system of claim 1, wherein the processor is configured to do one or both of the following based at least in part on sensor output data generated by the one or more cameras or sensors:
    control the actuator via the first controller to position the item in the position associated with item retrieval; and
    control the robotic retrieval device via the second controller to retrieve the item from the position associated with item retrieval.

6. The system of claim 1, wherein the actuator comprises one or more of a motor, a linear motor, and a motor-driven linear bearing.

7. The system of claim 1, wherein the surface comprises a conveyor belt and the first controller controls the actuator to advance the item under control of the first controller from a first end of the conveyor belt at which the item is loaded onto the conveyor belt to a pick up zone at a second end of the conveyor belt.

8. The system of claim 1, wherein the processor is configured to control one or more of the first controller, the second controller, the robotic retrieval device, and a carriage to position the item in the position associated with item retrieval and retrieve the item using the robotic retrieval device.

9. The system of claim 1, wherein the actuator is associated with a first kitting machine and the item comprises a first item of a first item type; and the system further comprises one or more additional kitting machines, each associated with a corresponding item of an associated item type.

10. The system of claim 9, wherein the processor is configured to detect that a new kitting machine has become associated with the system and to integrate the new kitting machine into the system.

11. The system of claim 10, wherein:
the processor is configured to integrate the new kitting machine into the system by registering the new kitting machine with a control computer, and performing one or more of the following:
initializing the new kitting machine;
determining one or more of a position, location, and orientation of the new kitting machine;
determining one or both of a corresponding item and a corresponding item type associated with the new kitting machine;
determine a capability of the new kitting machine;
adding the new kitting machine to a network associated with the system; and
performing an operational test on the new kitting machine.

12. The system of claim 1, wherein the processor is configured to:
control the actuator via the first controller to position the item in the position associated with item retrieval;
control the robotic retrieval device via the second controller to retrieve the item from the position associated with item retrieval;
receive from the one or more cameras or sensors an indication that the system has entered a state in which the system cannot continue a current kitting operation through automated operation; and
initiate on demand human teleoperation based at least in part on the indication.

13. The system of claim 12, wherein the on demand human teleoperation is provided via a teleoperation device associated with the system.

14. The system of claim 13, wherein the teleoperation device is associated with a plurality of robotic kitting systems that includes the system.

15. The system of claim 14, wherein at least a subset of the plurality of robotic kitting systems comprises robotic kitting systems located in one or more locations other than a first location in which the system is located; and wherein the on demand human teleoperation is configured to be performed using the teleoperation device remotely via a network.

16. The system of claim 1, further comprising:
a surface on which a bin comprising a plurality of items is disposed,
wherein:
an actuation of the actuator causes the actuator to move the bin to a pickup zone;
the plan comprises one or more instructions for controlling the actuator to move the bin from an initial position to the pickup zone in coordination with controlling movement of the robotic retrieval device to retrieve the item; and
the plan comprises one or more instructions for controlling to move the bin from the pickup zone after the robotic retrieval device retrieves the item from the bin.

17. The system of claim 16, wherein controlling to move the bin from the pickup zone after the robotic retrieval device retrieves the item from the bin comprises:
determining whether the bin is empty;
in response to determining that the bin is not empty, controlling the actuator to return the bin to the initial position; and
in response to determining that the bin is empty, controlling the robotic retrieval device to move the bin from the pickup zone to a predefined empty bin location.

18. The system of claim 17, wherein in response to determining that the bin is empty, controlling to move a replacement bin comprising a plurality of items to the initial position.

19. The system of 1, wherein:
the plan comprises a plurality of tasks; and
the system stores a plurality of predefined strategies for performing an individual task of the plurality of tasks.

20. The system of 1, wherein:
the robotic retrieval device comprises a robotic arm mounted on a carriage configured to translate along a rail or other linear guide; and
the second controller controls the carriage to move along the rail or other linear guide in connection with positioning the robotic arm in relation to one or more surfaces or receptacles comprising items for the robotic arm to operate to retrieve the item from one or more surfaces or receptacles and to place the item into the box or other container.

21. The system of claim 1, wherein an alternative strategy of the plurality of alternative strategies includes at least one of (i) using an alternate grip, (ii) approaching the item from a different angle, (iii) agitating or repositioning the item using the robotic retrieval device or terminal device attached to the robotic retrieval device, (iv) agitating or repositioning the item by controlling the actuator to move the surface or receptacle, (v) changing the terminal device attached to the robotic retrieval device to an alternate end effector and using the alternate end effector to engage the item.

22. The system of claim 1, wherein the second controller is further configured to:
control operation of the robotic retrieval device to collectively pack a plurality of items into the box or other container according to the plan.

23. A method to operate a kitting system comprising an actuator configured to move a surface or receptacle to a position associated with item retrieval, a first controller configured to control operation of the actuator, and a second controller associated with a robotic retrieval device, the method comprising:
using information obtained from one or more cameras or sensors in connection with determining one or more items to retrieve and pack into a box or other container, wherein determining the one or more items includes determining a location from which an item of the one or more items is to be retrieved, and determining one or more attributes associated with the item, and the one or more cameras or sensors are located within an environment in which a robotic retrieval device operates to retrieve the one or more items and pack the one or more items into a box or other container;
obtaining a plan to retrieve the item and to pack the item into the box or other container, wherein:
the plan is based at least in part on the one or more items to be retrieved, the location from which the item is to be retrieved, and the one or more attributes associated with the item;
the plan includes a coordination of controlling the robotic retrieval device via the second controller and the actuator via the first controller so that the actuator moves the item to the position associated with item retrieval and the robotic retrieval device moves to retrieve the item from the position associated with item retrieval; and
the obtaining the plan includes:
determining a plan to retrieve and collectively pack a plurality of items into the box or other container, the plurality of items comprising the item that is retrieved from the position associated with item retrieval;
using the actuator to position the item into the position associated with item retrieval; and
using the robotic retrieval device to retrieve the item from the position associated with item retrieval and place the item in a destination location, wherein retrieval and placement of the item is based at least in part on the plan, including:
using at least the robotic retrieval device to attempt to perform an individual task according to a first predefined strategy;
in response to determining that the performing the individual task according to the first predefined strategy was attempted, determining whether the individual task was completed successfully according to the attempt to implement the first predefined strategy;
in response to a determination by a processor that the individual task was not completed using the first predefined strategy;
determining that a plurality of alternative strategies are available to perform the individual task;
selecting a first alternative strategy to perform the individual task from the plurality of alternative strategies based on a respective confidence score associated with the first alternative strategy; and
iteratively using at least the robotic retrieval device to perform the individual task according to the plurality of alternative strategies for the individual task until the earlier of (i) the individual task is completed, or (ii) a prescribed number of attempts have been performed, wherein the plurality of alternative strategies are iteratively used based on their respective confidence scores; and
in response to a determination by the processor that the prescribed number of attempts have been performed, invoking a teleoperation for human intervention in which a user remotely controls the robotic retrieval device to perform the individual task,
wherein:
the actuator is used to position the item in the position associated with item retrieval in a manner that is synchronized at least in part with operation of the robotic retrieval device.

24. The method of claim 23, wherein the robotic retrieval device comprises a robotic arm having limited reach, and using the actuator to position the item in the position associated with item retrieval results in the item being placed within reach of the robotic arm.

25. The method of claim 23, wherein in response to the determination by a control computer that no further strategies exist, human operation in connection with performing the individual task is requested and further comprising:
receiving teleoperation instructions corresponding to human operation, the teleoperation instructions being received from a mobile device that is remote with respect to a physical site at which the system is located.

26. The method of claim 25, further comprising updating a set of strategies to enable the kitting system to repeat or emulate the actions corresponding to the teleoperation instructions to perform the individual task for which teleoperation instructions were received.

27. The method of claim 23, wherein the processor determines the plan to collectively pack the plurality of items into the box or other container.

28. The method of claim 23, wherein the robotic retrieval device comprises a plurality of terminal devices, wherein a first terminal device of the plurality of terminal devices is used in connection with performing the individual task according to the first predefined strategy and a second terminal device of the plurality of terminal devices is used in connection with performing the individual task according to at least one of the plurality of alternative strategies.

29. The method of claim 23, wherein the first predefined strategy is selected from among all strategies corresponding to performance of the individual task based on a determined preference or confidence score for the first predefined strategy compared to the plurality of alternative strategies.

30. The method of claim 23, wherein an order in which the plurality of alternative strategies are attempted is based at least in part on corresponding confidence scores for the plurality of alternative strategies.

31. The method of claim 23, wherein iteratively performing the individual task according to the plurality of alternative strategies comprise repositioning the item to a different position to facilitate the robotic retrieval device being able to retrieve the item.

32. The method of claim 31, wherein:
the using the actuator to position an item into the position, or the repositioning the item to a different position comprises moving the surface or receptacle to the position associated with item retrieval or the different position to facilitate the robotic retrieval device being able to retrieve the item the first controller controls the actuator to move the surface or receptacle, and the second controller controls the robotic retrieval device to retrieve the item from the position associated with item retrieval.

33. A computer program product embodied in a non-transitory computer readable medium and comprising computer instructions to operate a kitting system comprising an actuator configured to move a surface or receptacle to a position associated with item retrieval, a first controller configured to control operation of the actuator, and a second controller associated with a robotic retrieval device, the computer program product comprising computer instructions for:
using information obtained from one or more cameras or sensors in connection with determining one or more items to retrieve and pack into the box or other container, wherein determining the one or more items includes determining a location from which an item of the one or more items is to be retrieved, and determining one or more attributes associated with the item, and the one or more cameras or sensors are located within an environment in which the robotic retrieval device operates to retrieve the one or more items and pack the one or more items into a box or other container;

obtaining a plan to retrieve the item and to pack the item into the box or other container, wherein:
- the plan is based at least in part on the one or more items to be retrieved, the location from which the item is to be retrieved, and the one or more attributes associated with the item;
- the plan includes a coordination of controlling the robotic retrieval device via the second controller and the actuator via the first controller so that the actuator moves the item to the position associated with item retrieval and the robotic retrieval device moves to retrieve the item from the position associated with item retrieval; and
- the obtaining the plan includes:
  - determining a plan to retrieve and collectively pack a plurality of items into the box or other container, the plurality of items comprising the item that is retrieved from the position associated with item retrieval;

using the actuator to position the item into the position associated with item retrieval; and using the robotic retrieval device to retrieve the item from the position associated with item retrieval and place the item in a destination location, wherein retrieval and placement of the item is based at least in part on the plan, including:
- using at least the robotic retrieval device to attempt to perform an individual task according to a first predefined strategy;
- in response to determining that the performing the individual task according to the first predefined strategy was attempted, determining whether the individual task was completed successfully according to the attempt to implement the first predefined strategy;
- in response to a determination by a processor that the individual task was not completed using the first defined strategy;
  - determining that a plurality of alternative strategies are available to perform the individual task;
  - selecting a first alternative strategy to perform the individual task from the plurality of alternative strategies based on a respective confidence score associated with the first alternative strategy; and
  - iteratively using at least the robotic retrieval device to perform the individual task according to one or more other predefined strategies for the individual task until the earlier of (i) the individual task is completed, or (ii) a prescribed number of attempts have been performed, wherein the plurality of alternative strategies are iteratively used based on their respective confidence scores; and
- in response to a determination by the processor that the prescribed number of attempts have been performed, invoking a teleoperation for human intervention in which a user remotely controls the robotic retrieval device to perform the individual task;

wherein:
the actuator is used to position the item in the position associated with item retrieval in a manner that is synchronized at least in part with operation of the robotic retrieval device.

* * * * *